US006760300B1

(12) United States Patent
Eberle et al.

(10) Patent No.: US 6,760,300 B1
(45) Date of Patent: Jul. 6, 2004

(54) HIGH SPEED WIRELESS OFDM TRANSCEIVER MODEM

(75) Inventors: Wolfgang Eberle, Saarbruecken (DE); Liesbet Van der Perre, Leuven (BE); Steven Thoen, Blanden (BE); Bert Gyselinckx, Leuven (BE); Mark Engels, Wijgmaal (BE)

(73) Assignees: IMEC, Leuven (BE); SAIT Devlonics, Kortrijk (BE)

( * ) Notice: Subject to any disclaimer, the term of this patent is extended or adjusted under 35 U.S.C. 154(b) by 0 days.

(21) Appl. No.: 09/505,228

(22) Filed: Feb. 16, 2000

Related U.S. Application Data

(60) Provisional application No. 60/120,386, filed on Feb. 17, 1999.

(30) Foreign Application Priority Data

Sep. 9, 1999 (EP) ............................................ 99202904

(51) Int. Cl.⁷ ................................................. H04J 11/00
(52) U.S. Cl. .................... 370/210; 370/503; 379/406.8; 375/260; 375/219; 375/222
(58) Field of Search ................................ 370/203, 319, 370/343, 344, 210, 311; 375/240.18, 260, 130, 131, 144, 145, 146, 147; 455/38.3, 343; 379/406.13

(56) References Cited

U.S. PATENT DOCUMENTS

| | | | | |
|---|---|---|---|---|
| 5,825,807 A | * | 10/1998 | Kumar | 375/130 |
| 6,018,642 A | * | 1/2000 | Adachi | 340/7.33 |
| 6,246,713 B1 | * | 6/2001 | Mattisson | 375/132 |
| 6,269,132 B1 | * | 7/2001 | Yonge, III | 375/346 |
| 6,512,737 B1 | * | 1/2003 | Agee | 370/208 |

FOREIGN PATENT DOCUMENTS

| | | |
|---|---|---|
| GB | 2 311 196 A | 9/1997 |
| WO | WO 97/29568 | 8/1997 |

OTHER PUBLICATIONS

Adriaensen, et al.: "Single chip DMT–modem transceiver for ADSL"., IEEE International ASIC Conference, Sep. 23–27, 1996, pp. 123–126, XP002129676.

(List continued on next page.)

*Primary Examiner*—Alpus H. Hsu
*Assistant Examiner*—Thien Tran
(74) *Attorney, Agent, or Firm*—Knobbe Martens Olson & Bear LLP

(57) ABSTRACT

An apparatus for receiving and/or transmitting signals using orthogonal frequency division multiplexing, said apparatus being adapted for outputting a first output signal, comprising:

a time synchronisation circuit, being adapted for determination of control information from a first signal, said first signal comprising at least of a first part being a non-orthogonal frequency division multiplexing signal and a second part being an orthogonal frequency division multiplexing signal, said determination of control information exploiting said first part of said first signal;

said time synchronisation circuit, further being adapted for converting said second part of said first signal into a second signal, being in time domain representation;

a transformation circuit at least converting said second signal into a third signal, being in frequency domain representation;

a first frequency domain circuit, at least converting said third signal into said first output signal; and said second signal and said second part of said first signal being orthogonal frequency division multiplexing signals.

42 Claims, 12 Drawing Sheets

OTHER PUBLICATIONS

Chin–Liang Wang, et al.: "A novel DHT–based FFT/IFFT processor for ADSL transceivers", 1999 IEEE International Symposium on Circuits and Systems, Apr. 30, 1999–Jun. 2, 1999, pp. 51–54, XP002129677.

Chang, R.W. Synthesis of band–limited orthogonal signals for multichannel data transmission, Bell syst. Tech. J., vol. 45, pp. 1775–1796, Dec. 1966.

Saltzberg, B.R. Performance of an efficient parallel data transmission system, IEEE Trans. Comm. Technol., vol. COM–15, Dec. 1967.

Meuller, T. Brueninghaus, K. and Rohling H. Performance of Coherent OFDM–CDMA for Broadband Mobile Communications, Wireless Personal Communications 2, Kluwer Academis Publishers, 1996, pp. 295–305.

Kaiser S. OFDM–CDMA versus DS–CDMA: Performance Evaluation for Fading Channels, ICC '95, pp. 1722–1726.

Kalet, The Multitone Channel, IEEE Trans. Commun, vol. 37, No. 2, Feb. 1989.

Fazel and G. Fettweis, Multi–Carrier Spread–Spectrum, Kluwer Academic Publ., 1997.

Weinstein, S.B. and Ebert, P.M. Data transmission by frequency division multiplexing using the discrete Fourier transform, IEEE Trans. Comm. Technol, vol. COM–19, No. 15, Oct. 1971.

Bidet, E. Joanblanq, C. and Senn, P. A fast 8K FFT VLSI chip for large OFDM single frequency networks, Proc. Intl. Conf. On HDTV 94, Torino, Italy, Oct. 1994.

Chow, J.S. Tu, J.C. and Cioffi, J.M. A discrete Multitone transceiver system for HDSL applications, IEEE J. on Selected Areas in Commun., vol. SAC–9, Aug. 1991.

Vande Laar, F. Philips, N. and Huisken, J. Towards the next generation of DAB receivers, EBU Technical Review, No. 272, Summer 1997, pp. 46–59.

I. Shweky, A. Badihi, A CSP Optoeletronic Package for Imaging and Light Detection Applications; ShellCase, POB 48328, Jerusalem 96251, Israel.

ETSI, The COFDM system intended for digital audio broadcasting takes benefit from time, frequency and space diversity, french contribution to CCIR WP10 and 10–11S, Oct. 1997, pp. 1–48.

* cited by examiner

HIGH SPEED WIRELESS OFDM TRANSCEIVER MODEM

This application claims the benefit of provisional application 60/120,386 filed Feb. 17, 1999.

BACKGROUND OF THE INVENTION

1. Field of the Invention

The invention relates to flexible or programmable, fast and power efficient wired or wireless communication systems and methods based on the orthogonal frequency division multiplexing modulation technique.

2. Description of the Related Art

The idea to use multicarrier methods as a modulation technique is known in the prior art (Chang, R. W. Synthesis of band-limited orthogonal signals for multichannel data transmission, Bell syst. Tech. J., vol.45, pp. 1775–1796, December 1966 and Saltzberg, B. R. Performance of an efficient parallel data transmission system, IEEE Trans. Comm. Technol., vol. COM-15, December 1967). The possible benefits following from multicarrier methods have been mentioned in many articles (Meüller, T. Brueninghaus, K. and Rohling H. Performance of Coherent OFDM-CDMA for Broadband Mobile Communications, Wireless Personal Communications 2, Kluwer Academis Publishers, 1996, pp. 295–305 and Kaiser, S. OFDM-CDMA versus DS-CDMA: Performance Evaluation for Fading Channels, ICC '95, pp. 1722–1726). The basic idea of multicarrier methods is to distribute the bits of the data signal to be transmitted over a plurality of carriers. Theoretical publications have been written on this attractive modulation technique (Kalet, The multitone Channel, IEEE Trans. Commun., vol. 37, no. 2, February 1989 Fazel and G. Fettweis, Multi-Carrier Spread-Spectrum, Kluwer Academic Publ., 1997). These articles only consider one aspect of the complete communication system, or they presume assumptions such as perfect synchronisation or a Gaussian channel, by which some of the technically most arduous problems are avoided. First only simple complete multicarrier (MC)-based communication systems were realised. For a large number of carriers, the arrays of sinusoidal generators and coherent demodulators required in a parallel system become unreasonably expensive and complex. Second, the idea to use the Discrete Fourier Transform (DFT) to realise parallel data transmission systems was applied (Weinstein, S. B. and Ebert, P. M. Data transmission by frequency division multiplexing using the discrete Fourier transform, IEEE Trans. Comm. Technol., vol. COM-19, No. 15, October 1971). Thanks to the evolution of Digital Signal Processing and VLSI technology, the actual use of MC modems based on (I)FFT processing (these are often called Discrete Multi Tone (DMT) modems), has become feasible (Bidet, E. Joanblanq, C. and Senn, P. A fast 8K FFT VLSI chip for large OFDM single frequency networks, Proc. Intl. Conf. On HDTV 94, Torino, Italy, October 1994). At the moment, DMT modems have been realised for wired communication media. For example, xDSL-products for copper wire transmission, are commercially available nowadays (Chow, J. S. Tu, J. C. and Cioffi, J. M. A discrete Multitone transceiver system for HDSL applications, IEEEE J. on Selected Areas in Commun., vol. SAC-9, August 1991). Wireless channels and wireless terminals impose however significant different working conditions and requirements on the transceiver modems. For example, the variability of the channel is much higher in wireless applications, and thus special measures accounting for this have to be taken (e.g. an adaptive equaliser is needed). Also, the echo-profile is significantly different on wireless channels and asks for dedicated approach in the modem. On wireless channels, broadcasting systems based on OFDM are very attractive (The COFDM system intended for Digital Audio Broadcasting takes benefit from time, frequency and space diversity, French Contribution to CCIR WP10 and 10–11S, October 1991), and the Digital Audio Broadcasting (DAB) system is already operational. These broadcasting systems involve one-way transmission, and thus separate transmitter and receiver modems have been developed and built in this context (Van de Laar, F. Philips, N. and Huisken, J. Towards the next generation of DAB receivers, EBU Technical Review, No. 272, Summer 1997, pp. 46–59). For broadcasting applications, the transmitter power is high and there is no need to minimise this, in contrast to point-to-point communication applications. Moreover, in the acquisition strategy it can be assumed that there is always a signal present. A null in the signal is used to obtain rough synchronisation. These are conditions that are not valid for point-to-point communications, and as a consequence the difficult acquisition problem should there be handled in a different way.

Aim of Invention

It is the aim of the invention to present an apparatus and a method for receiving and/or transmitting signals using orthogonal frequency multiplexing which can be used but is not limited to conditions for wireless and point-to-point communication. Further said apparatus and said method provides a solution for all critical blocks and implementation issues needed for the realisation of an OFDM-based transceiver. The apparatus and method show a large flexibility, enabling optimisation towards particular communication situations. The resulting apparatus and method are efficient for power consumption and speed, resulting in high data rates.

SUMMARY OF THE INVENTION

In a first aspect of the invention an apparatus for signal transmitting and/or receiving preferably used for but not limited to wireless communication and exploiting OFDM as modulating technique is disclosed. Said signal transmitting and/or receiving apparatus using orthogonal frequency division multiplexing comprises of a first frequency domain circuit (105), a transformation circuit (103), a time synchronisation circuit (17) and a second frequency domain circuit (13). Said circuits are interconnected.

Signals, being used in said apparatus, are characterised to be either in a frequency domain representation (104, 107) or in time domain representation (101, 102, 100, 106, 108).

Signals, being used in said apparatus, are characterised to be either non-orthogonal frequency division multiplexing signals or orthogonal frequency division multiplexing signals. With being a non-orthogonal frequency division multiplexing signal is meant that the signal contains at least some non-OFDM symbol samples. Alternatively an orthogonal frequency division multiplexing signal comprising entirely of OFDM-symbol samples. With an OFDM symbol is meant a symbol that is generated by transforming a sequence coming from said second frequency domain circuit (13) and transformed by said transformation circuit (103). This characterisation is only done for signals in time domain representation. Signals can comprise of parts. Such a part can be either an OFDM-signal or a non-OFDM signal. Signals (102, 108) are OFDM signals. Signal (101) comprises at least of a first part, being a non-OFDM signal and a second part, being a OFDM signal. Signals (100, 106) are non-OFDM signals.

In a first embodiment of this first aspect of the invention it is indicated that in the receiving part of the circuit (circuits (17), (103), (105)) the time synchronisation circuit (17) determines control information on that part of its input (101) being a non-orthogonal frequency division multiplexing signal, for instance partly comprising of a Pseudo-Noise sequence. Said control information can be signal level information, carrier offset or timing information. The signal conversions in the time synchronisation circuit (17) comprise at least of carrier offset compensation and guard interval removal.

In a second embodiment of this first aspect of the invention both the receiving part (circuits (17), (103), (105)) and the transmitting part (circuits (13), (103)) of the circuit are presented. The transformation circuit (103) is part of both the transmitting and the receiving part of the circuit.

In a further embodiment of this first aspect of the invention said transformation circuit (103) comprises of a cascade of a fast Fourier transform circuit (15) and a symbol reordering circuit (16), enabling guard interval introduction.

In a further embodiment of this first aspect of the invention said first frequency domain circuit (105) comprises of a cascade of an equalisation circuit (18) and a demapping circuit (19).

In a further embodiment of this first aspect of the invention said time synchronisation circuit comprises of a timing synchronisation circuit (40), a gain or signal level control circuit (39), a carrier offset estimation circuit (41) and a carrier offset compensation circuit (42). The time synchronisation circuit can also remove the guard interval.

In a further embodiment of this first aspect of the invention it is emphasized that the reordering circuit is exploited as a first step for despreading, (for instance) by organising related carriers together to facilitate easy despreading.

In a further embodiment of this first aspect of the invention the flexibility of the circuit is presented. In said circuit, the integer N, characterising the N-point Fast Fourier Transform, the amount of carriers, the length of the guard interval, the spreading factor and spreading code and the amount of zero carriers, are programmable.

In a second aspect of the invention methods for operating an apparatus for receiving and/or transmitting signals are disclosed. Said transmitting and/or receiving apparatus can be said apparatus of the first aspect of the invention although the operating methods are not limited thereto.

In a first embodiment of this second aspect of the invention in said apparatus two data flows are defined and only one of said data flows is active at a time. One data flow (13), (103) is active during transmitting, the other during receiving (17), (103), (105). As such a half-duplex mode of operation is presented. The time synchronisation circuit (17) controls the powering on or off of the transformation circuit (103) and the first frequency domain circuit (105) during receiving.

In a second embodiment of this second aspect of the invention the operation of said symbol reordering circuit (16) is disclosed.

In a third aspect of the invention a method for communicating data between a transmitting apparatus and a receiving apparatus, is disclosed. Said method for communicating data between a transmission circuit and a receiving circuit using orthogonal frequency division multiplexing comprises the steps of sending a training signal by said transmission circuit, sending a data signal by said transmission circuit, said data signal at least comprising said data modulated by said transmission circuit with orthogonal frequency division multiplexing, determining in said receiving circuit control information while receiving said training signal and from said training signal by using first time domain operations and demodulating in said receiving circuit said modulated data while receiving said data signal. Said training signal is at least partly a non-orthogonal frequency division multiplexing signal, for instance part of said training signal can be a Pseudo Noise sequence.

Said transmitting apparatus and said receiving apparatus can be said apparatus of the first aspect of the invention although the method is not limited thereto.

DETAILED DESCRIPTION OF THE INVENTION

The present invention will be described with reference to certain embodiments and with reference to particular drawings but the invention is not limited thereto but only by the claims. The figures are not considered to be limiting the present invention.

In a first aspect of the invention a signal transmitting and/or receiving apparatus, exploiting orthogonal frequency division multiplexing, is presented.

Figure 3:
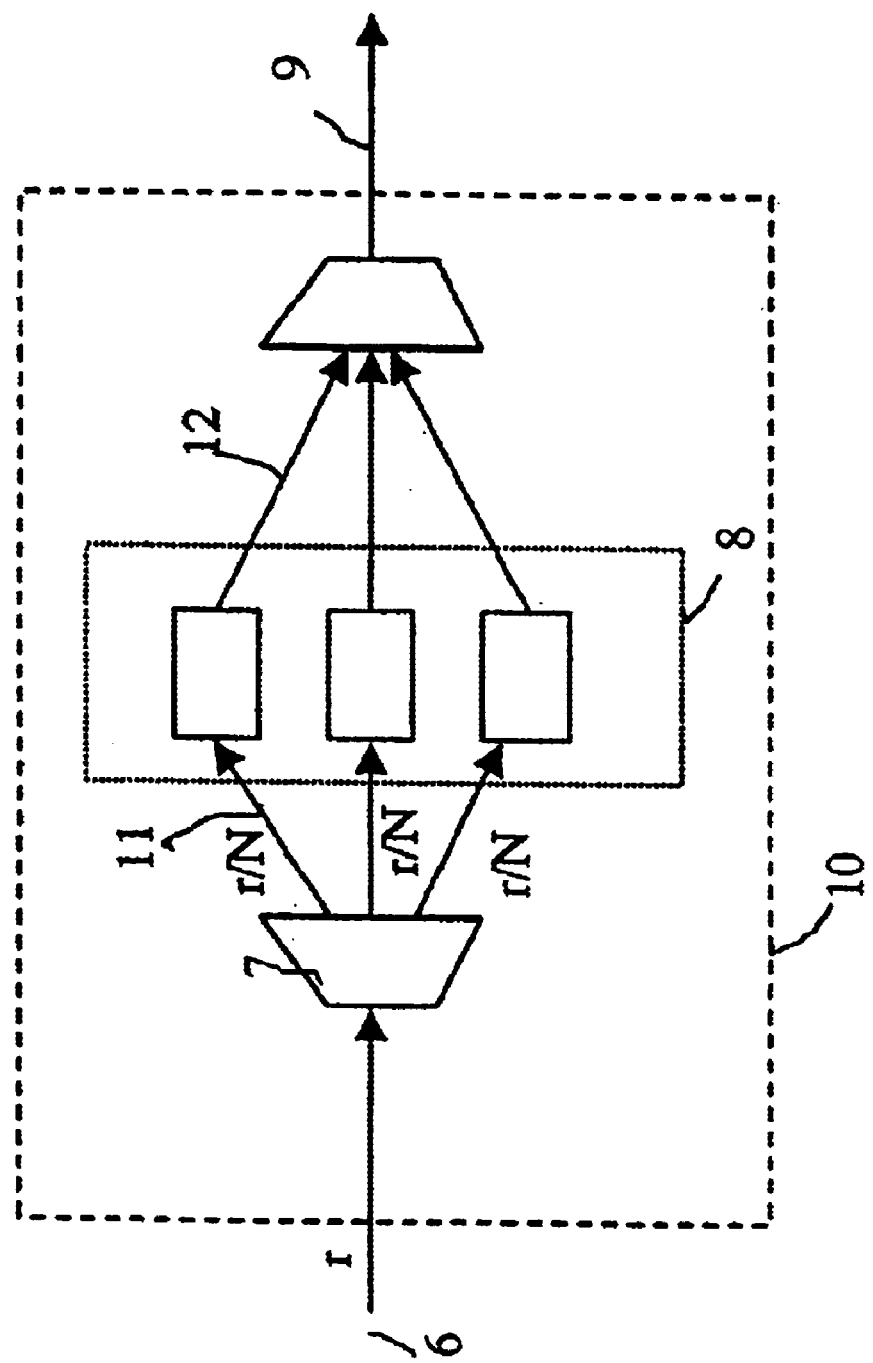
FIG. 3: illustrates modulation of a data signal with Orthogonal Frequency Division Multiplexing. The data signal (6) is demultiplexed in a plurality of signals (11), each of said signals being modulated by a different carrier. Said carriers are chosen to be orthogonal.

Said apparatus implements a multi-carrier approach, more in particular orthogonal frequency division multiplexing (OFDM) as modulation technique. The principal idea of modulating with a multi-carrier approach (FIG. 3) (10) is to demultiplex (demultiplexer (7)) a single signal (6) with rate r into N parallel data streams of rate r/N (11), modulating said data streams with a different carrier (modulators (8) and modulated signals (12)) and transmitting the modulated data streams simultaneously through the same channel (transmitted signal (9)). In OFDM the pulses used for transmitting on said carriers are rectangular. The carriers are not located in a separate frequency band but are chosen such that their spectra are orthogonal. OFDM modulation can be performed by exploiting an inverse Fourier transform.

In a second aspect of the invention methods for operating a signal transmitting and/or receiving apparatus exploiting orthogonal frequency division multiplexing are presented.

Figure 1:
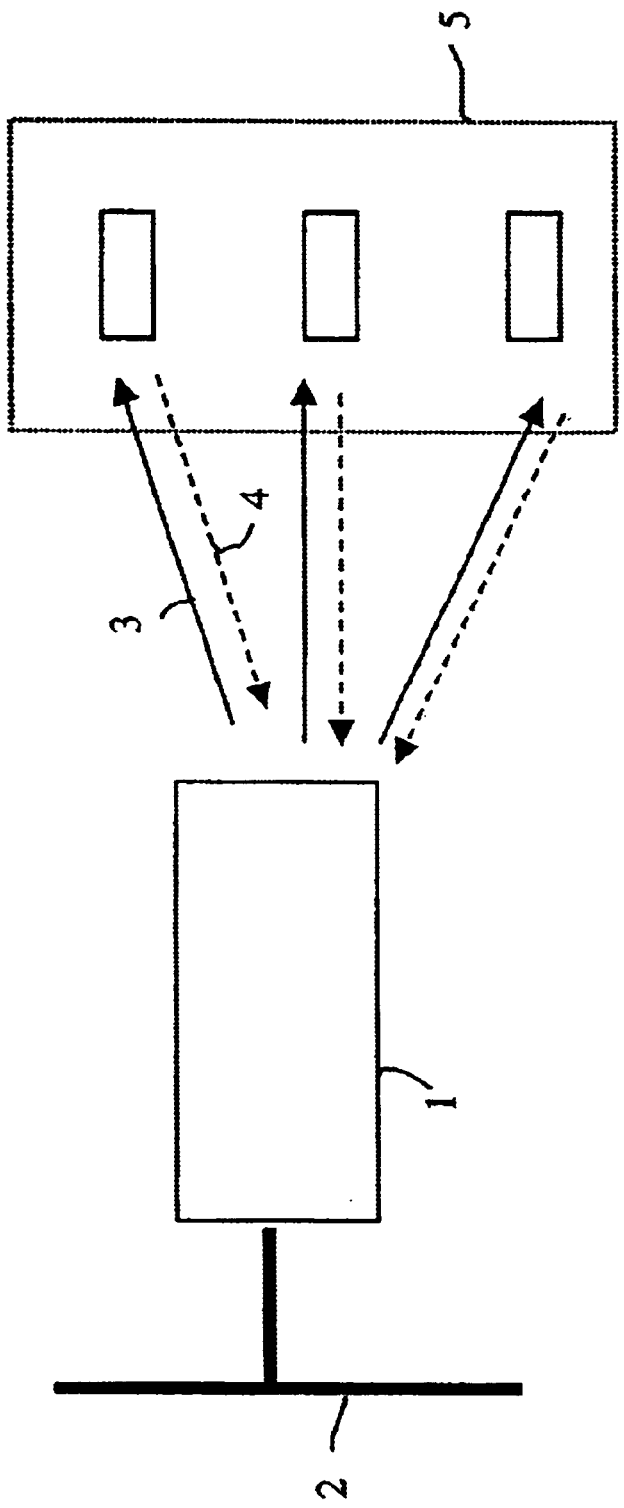
FIG. 1: shows as first set-up, wherein the invented signal transmitting and/or receiving apparatus (1) fits, a star network. The use of said invented apparatus is not limited to such a star network though.
Figure 2:
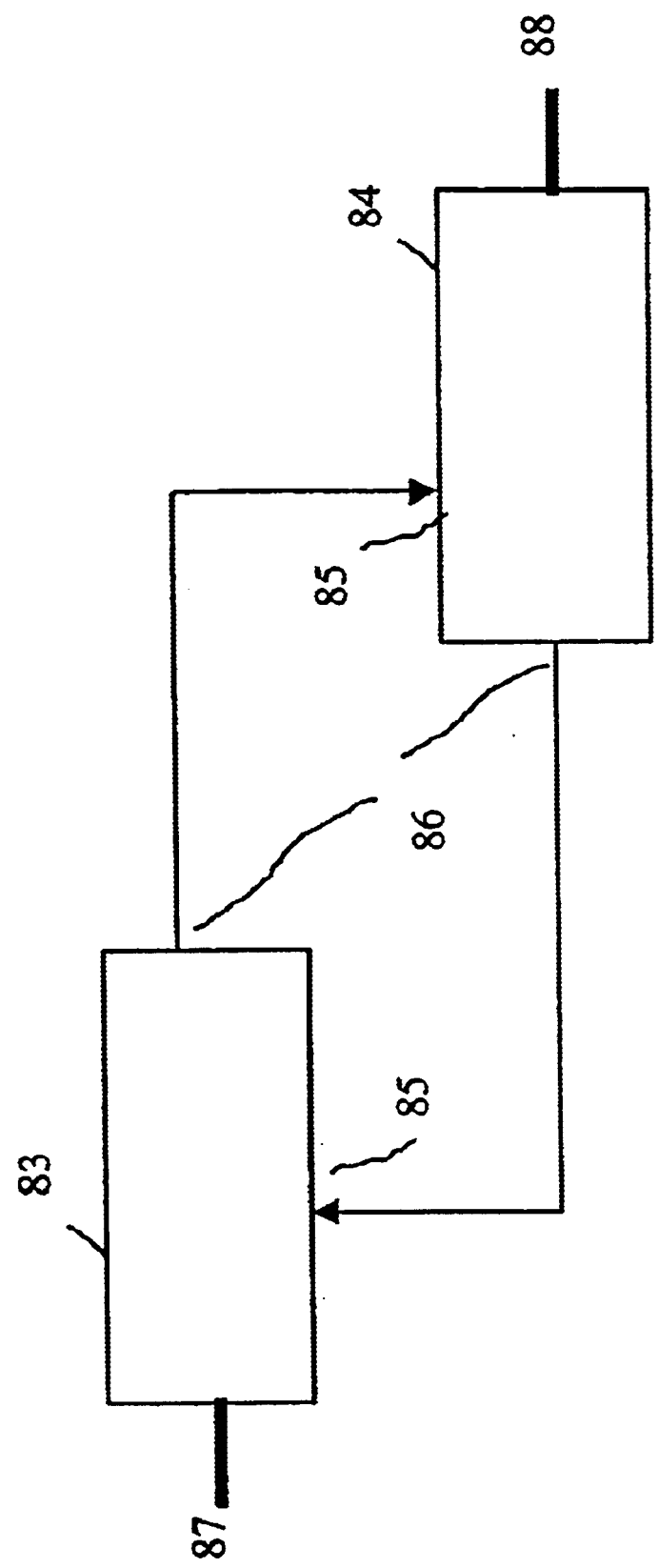
FIG. 2: shows as second set-up, wherein the invented signal transmitting and/or receiving apparatus fits (83) or (84), a more general communication scheme. The use of said invented apparatus is not limited to such a communication scheme though.

The signal transmitting and/or receiving apparatus fits into a communication network (FIG. 2, bottom), comprising of at least two of said apparatus (83)(84). For instance said communication network can be a star network (FIG. 1) in which one of said apparatus, serving then as base station, can for instance communicate with a backbone (2) and other apparatus, serving then as terminals (5). Said base station apparatus is physically connected to a backbone (2) enabling wired communication (communication to a wired network). Said basestation performs wireless communication with several terminals (5). Said wireless communication comprises of uplink (4) and downlink communication (3). Downlink communication comprises of data transfer from the basestation to the terminals. Uplink communication comprises of data transfer from the terminals to the basestation. Said base station and said terminals essentially have similar transmitting (inclusive modulation) and receiving (inclusive demodulation) functionality and thus said star network fits in the general communication scheme depicted in FIG. 2, bottom with (87) representing for instance the wired communication with the backbone, (88) the further communication of the terminal and (85) and (86) respectively receiving and transmitting means for wireless communication.

In a third aspect of the invention methods for communicating data (between two apparatus) based on orthogonal frequency division multiplexing (OFDM) are presented. One of said apparatus is denoted the transmitting circuit and the other apparatus is denoted the receiving circuit. The transmitting circuit can be one of the receiving and/or transmitting apparatus described in the first aspect of the invention, being in transmitting mode. The receiving circuit can be one of the receiving and/or transmitting apparatus described in the first aspect of the invention, being in receiving mode.

The signals (signal representations) and operations on said signals, used in the further description of the invention, are shortly introduced.

(Wireless) transmission of data or a digital signal from a transmission to a receiving circuit requires digital to analog conversion in the transmission circuit and analog to digital conversion in the receiving circuit. In the further description it is assumed that the two apparatus in the communication set-up have transmission and receiving means, also denoted front-end, incorporating these analog to digital and digital to analog conversion means including amplification or signal level gain control and realising the conversion of the RF signal to the required baseband signal and vice versa. A front-end can comprise of amplifiers and mixers (down converters). As such in the text all signals are represented as a sequence of samples (digital representation), well knowing that the above mentioned conversion must take place. Said assumption does not limit the scope of the invention though.

Figure 4:
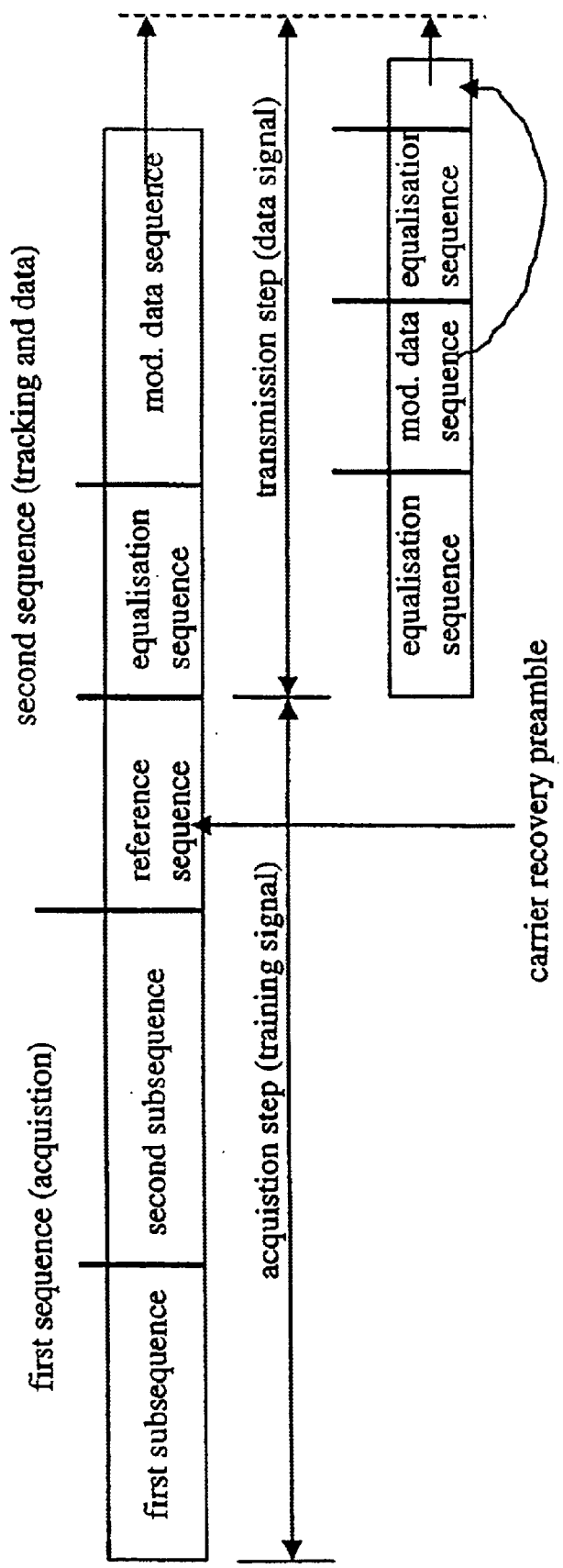
FIG. 4: presents the sequences exploited in the invented communication method. In the acquisition step a training signal comprising of a first sequence and a reference sequence is send. In the transmission step a data signal comprising of modulated data sequences and equalisation sequences is transmitted. Said training signal comprises at least of two parts, a first part being a non-OFDM signal, a second part being an OFDM signal. Said first part is exploited for determining control information such as carrier offset, timing information, signal level information. Said second part carrying the data.

Communication of a data or a digital signal is thus symbolised as transmitting and receiving of a sequence of (discrete) samples. In the invention said sequence is subdivided in a first sequence of samples (also denoted acquisition sequence) and a second sequence of samples (also denoted the tracking and data sequence). Said second sequence further comprises of a first subsequence of reference samples, also denoted reference sequence or carrier recovery preamble, a second subsequence of equalisation samples, also denoted equalisation sequence and a sequence of data samples, also denoted data sequence (FIG. 4, top).

Said first sequence (acquisition sequence) and said reference sequence together form a training sequence or training signal, while said equalisation sequence and said data sequence together form a data signal. Said first sequence is needed for synchronisation purposes.

In an embodiment of the invention said first sequence comprises of a first subsequence and a second subsequence. The first subsequence is used for determining relative timing information while the transition from the first subsequence to said second subsequence is exploited for determining absolute timing information.

In another embodiment of the invention said first sequence comprises of a plurality of subsequences. The ordering of said subsequences in said first sequence represents a code. Detection of said code is used for retrieving timing information. Again the sequences itself are used for retrieving relative timing information while the detection of the code results in retrieving absolute timing information. Note that said sequences can be Pseudo Noise sequences.

The reference samples of said second sequence are exploited for estimation of the carrier offset. The equalisation samples of said second sequence are used for estimation of channel information while the data sequence contains the digital signal one wants to communicate from the transmission to the receiving circuit. In the text with demodulation both the actual demodulation of the data sequence and channel information estimation is meant. Said sequence of data samples can be interrupted with said equalisation sequence in order to adapt to changing channel situations (FIG. 4, bottom).

The samples of the sequences (representing signals) described above are time samples. A sequence with a fixed amount of time samples defines a time domain symbol. Another way of representation of signals is to describe them as a sequence with a fixed amount of frequency samples. Each frequency sample contains the amplitude and phase information of the carrier of the corresponding frequency. The way in which the digital samples are assigned to the carriers is determined by the modulation scheme (e.g. QAM or QPSK).

In the signal transmitting and/or receiving apparatus both frequency and time representations appear. Conversion from a frequency to time symbol representation or vice versa is exploited in the description when considering signal transformations performed by a (inverse) Fourier transform circuit, a mapping circuit (13) or a demapping circuit (19). Moreover it depends whether the apparatus is transmitting or receiving which representation is used in the connections between the circuits used in the apparatus. A characteristic of a sequence is the length of the sequence. Fourier and inverse Fourier transform do not change the length of the sequence. The length of a sequence is changed by appending or deleting some samples. As it can be important to indicate where these samples are appended an ordering is used. In a time domain symbol with the front part of the sequence is meant located earlier in time, with the last samples it is meant located later in time. In a frequency domain symbol, with the front part of the sequence is meant located at the lowest frequencies while with the last samples of the sequence is meant located at highest frequencies. Appending is used for guard introduction, a technique for minimising intersymbol interference.

Figure 5:
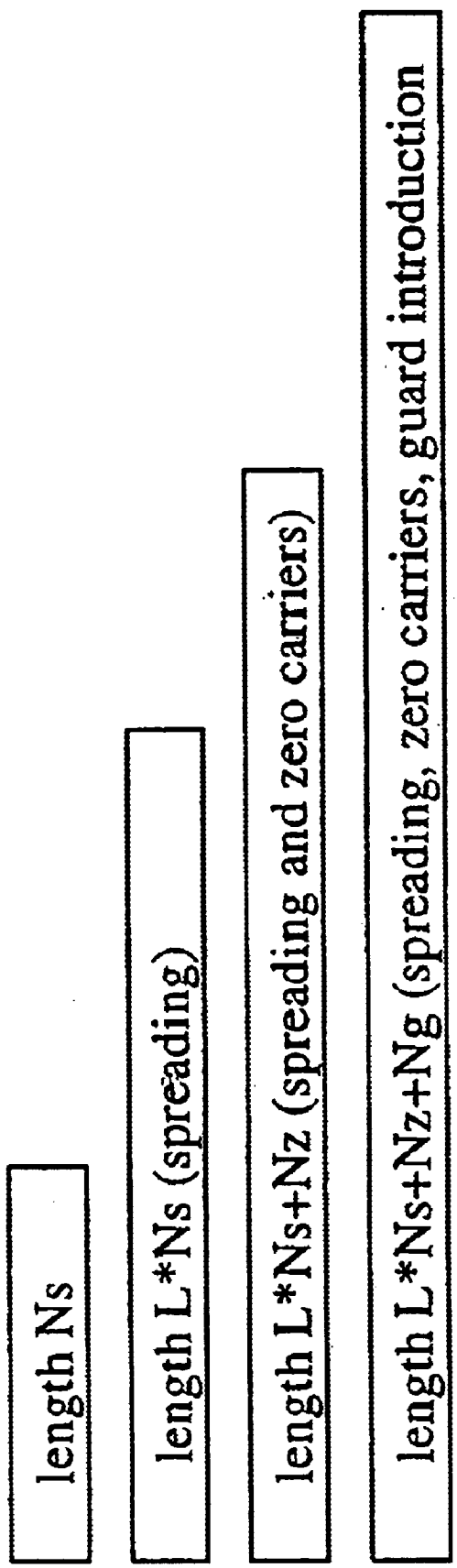
FIG. 5: shows the various lengths of the sequences involved in the invention. The shortest sequence has length $N_s$. Due to spreading a sequence with length $L*N_s$ is obtained. Addition of zero carriers further increases the length with $N_z$ samples. Guard interval introduction results in an increase of the length with another $N_g$ samples.

A frequency domain symbol defined above is directly related to a set of carriers. In an embodiment of the invention three sets of carriers are introduced. A first set of Ns carriers is defined. With said set a frequency domain symbol can be defined. Another possibility is to use a second set of L*Ns carriers for representing the signal, whereby the amplitude and phases of all these carriers are determined by multiplying the amplitude and phases of said first set of carriers with L complex numbers. As such redundancy can be introduced. This operation is called spreading. The L complex numbers define a spreading code. Moreover it can be useful to leave certain carriers (frequencies) unused. As such a third set of Nc (>L*Ns) carriers is introduced, comprising at least of the second set of carriers and whereby some of the Nc carriers do not contain information (zero carriers). Nz is the amount of zero carriers. Said zero carriers are used to cope with roll-off phenomena. For instance the carriers at the edges of the frequency interval being used can be not reliable. An overview is presented in FIG. 5. The amount of zero carriers Nz, the length of the spreading code, the spreading code, the amount of carriers Ns can be chosen or are programmable.

In the description the notion of related carriers is introduced. A first carrier from said first set, also denoted the unspreaded set, is related to a second carrier from said second set, also denoted the spreaded set, when its amplitude and phase information is derivable or can be determined from the amplitude and phase information of said second carrier. Two carriers of the spreaded set are called related if they carry the same data, which means that they have been derived from the same carrier of the unspreaded set.

In the description reordering of samples is used. What is meant with the order of a sequence is how the sequence leaves a certain circuit as function of time. Note that the same definition holds for a frequency and time symbol.

As mentioned already above modulation and demodulation relies on a(n) (inverse) Fourier transform circuit. The implementation of this circuit is such that the output as function of time is not what one expects from the mathematical point of view whereby one implicitly assumes that the first component of the transformed signal should leave the circuit first, thus a linearly ordering. This is because a fast and memory efficient implementation of the Fourier transform circuit is exploited. Reordering means changing the ordering of the samples as function of time.

Above carriers are introduced as signals with orthogonal spectra. Besides these spectra also a main carrier for the (wireless) communication is introduced. This main carrier must not be confused with the modulation carriers. When carrier offset estimation and compensation is mentioned in the description this refers to the main RF carrier only.

In the detailed description with digital signal the signal to be modulated (106) or found after demodulating a modulated signal (100) is meant. For instance, this is the signal said base station would receive or transmit via the backbone or a terminal would receive or transmit from or to its connected application. In the apparatus a modulating data flow (13), (15), (16) and a demodulating data flow (17), (15), (16), (18), (19) are recognised. The modulated signal is the signal found at the end of the modulating data flow of the transmitting circuit (108). The same signal (although modified by the channel) is found at the beginning of the demodulating data flow of the receiving circuit (101). At the end of the demodulating data flow of the receiving circuit naturally the demodulated modulated signal (100) or thus the signal itself is found in case of ideal error free transmission only.

In the modulating data flow in the transmission circuit the following signals are used: The carriers of the signal (107), being in frequency representation, are defined by the mapper. Said signal has Nc carriers and contains possibly zero carriers. It must be emphasised that said signal is initially constructed from a signal with length Ns on which spreading may be applied. When this is the case many carriers of the signal of length Nc=L*Ns are related to the same carrier of the signal of length Ns. L is the spreading code length. The length and the spreading code are programmable. Signals, being constructed by transforming a set of carriers, from frequency domain representation to time domain representation are denoted symbols.

The first time domain symbol is defined as the inverse Fourier transform of the signal (107). Its length is also Nc.

The second time domain symbol (108) is a reordered version of the first time domain symbol. Also the Ng last components of the reordered version are prepended to the front part of this reordered symbol. Its length is thus Nc+Ng.

In the demodulating data flow in the receiving circuit the following signals are used. The signal (101) can comprise of several parts. At least one part of said signal being an OFDM symbol. At least one other part of said signal being a non-OFDM signal.

The third time domain symbol is that part of signal (101), being a OFDM symbol, said symbol being received by the receiving means or front-end of the receiving circuit. Said symbol contains the modulated signal (length Nc+Ng).

The fourth time domain symbol (102) is obtained by compensating in the third time domain symbol for the carrier mismatch between the transmitting and receiving circuit and omitting the guard interval (length Nc).

Another signal in frequency domain representation is defined as the Fourier transform of said fourth time domain symbol (102) (length Nc) and possibly contains unused (zero) carriers.

The signal (104), being in frequency domain representation, (length Nc) is defined as a reordered version of the output signal of the Fourier transform circuit (15) whereby the zero carriers are possibly grouped at adjacent frequencies. Due to spreading any carriers of the signal may 'relate' to one carrier of a signal with length Ns, it is possible to reorder the signal samples such that the related samples are positioned at adjacent frequencies. Reordering can thus be considered as a first step for despreading. The grouping of the related samples without spaces between them enables processing without interrupts, and thus results in efficient despreading.

In an aspect of the invention a signal transmitting and/or receiving apparatus using orthogonal frequency division multiplexing comprising a first frequency domain circuit (105), a transformation circuit (103), a time synchronisation circuit (17) and a second frequency domain circuit (13) is disclosed.

Figure 6:
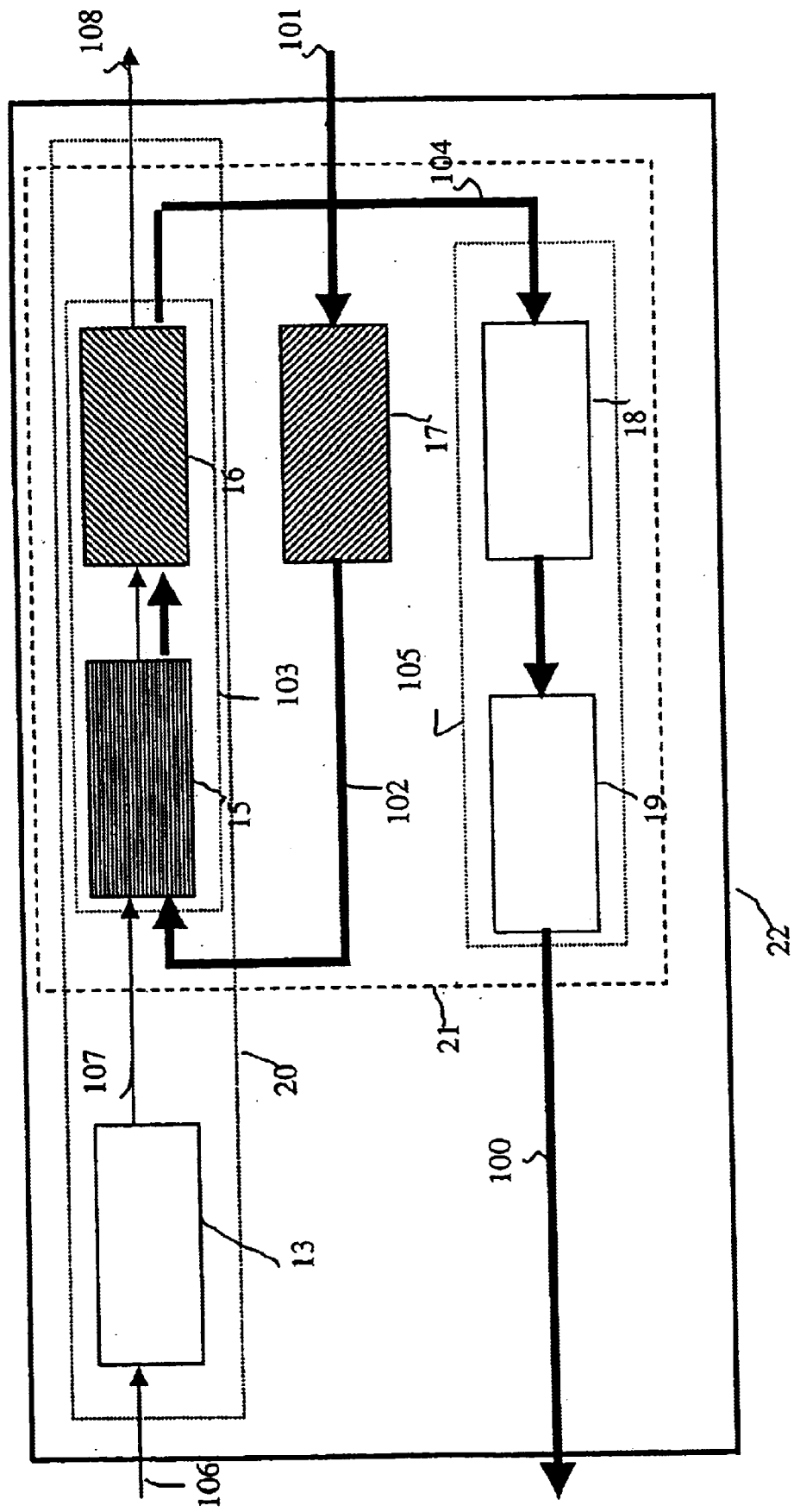
FIG. 6: shows the architecture of a particular embodiment of the signal transmitting and/or receiving circuit. In said architecture two dataflows are recognized. The apparatus comprises of a mapper circuit (13), a fast Fourier transform circuit (15), a symbol reordering block (16), a time synchronisation circuit (17), an equalisation circuit (18) and a demapping circuit (19). Said fast Fourier transform circuit and said symbol reordering block can be considered as one transformation circuit (103). Said equalisation circuit and demapping circuit can be considered as a first frequency domain circuit (105). Said mapper circuit (13) can also be denoted as second frequency domain circuit.

In an embodiment of the invention the modem architecture (22) (circuits and interconnection pattern) for realising said modem is presented (FIG. 6). Said architecture comprises essentially of the following circuit: a mapper circuit (13), also denoted second frequency domain circuit, an IFFT (FFT) circuit (15), also denoted (I)FFT circuit, a symbol reordering circuit (16), a time synchronisation circuit (17), an equalisation circuit (18), a demapper circuit (19), and means for transmission and means for receiving. Said IFFT (FFT) circuit and said symbol reordering circuit form together said transformation circuit (103). Part of said blocks are used in the modulating dataflow (20). Part of said blocks are used for the demodulating dataflow (21).

It is recognised that said modem has two possible outputs (108), (100): a modulated signal sent by its transmission means (108) and the signal received by its receiving means after conversion (demodulation) by said modem (100). The modem has two inputs (106), (101): the signal to be converted (modulation) by said modem (106) and the modulated signal received by its receiving means (101). The input signal (106) of the mapper circuit (16) is the signal to be modulated and can be represented as a sequence of time samples.

In the transmitting data flow the signal (107) between the mapper circuit (16) and the inverse Fourier transform (15) can be interpreted as a frequency domain signal. The signal between the Fourier transform circuit (15) and the reordering circuit (16) is denoted the first time domain symbol. The signal (108) after the reordering circuit (16) and the transmission means (including digital to analog conversion and additional radio frequency modulation) is denoted the second time domain symbol (reordered and after guard interval introduction).

In the receiving data flow the part of the input signal (101) of the synchronisation circuit (17), being an OFDM signal, defines a third time domain symbol. After said synchronisation circuit a fourth time domain symbol (102) is defined. The main carrier (radio frequency carrier) offset compensation and removal of the guard interval is performed in that circuit. Said fourth time domain symbol is transformed by the Fourier transform circuit (15) into a frequency domain signal, reordering and grouping zero carriers is performed in the reordering circuit (16) resulting in another frequency domain signal (104). Said symbol is filtered (18) and demapped (19), resulting in the demodulated modulated digital signal (100).

Note that the input signal (101) at least also comprises of a part being a non-OFDM signal. Said part is used for timing synchronisation, thus determining relative and absolute timing information. Said part is further used for carrier offset estimation and signal level determination.

Note that said modem or apparatus provides both modulation and demodulation facilities. In an embodiment of the invention said facilities are not intended to be invoked simultaneously, hence said modem or apparatus works in half duplex mode.

In an embodiment of the invention an apparatus for receiving and/or transmitting signals using orthogonal frequency division multiplexing, said apparatus being adapted for outputting a first output signal (100), comprising a time synchronisation circuit (17) at least converting a first signal (101) into a second signal (102), a transformation circuit (103) at least converting said second signal (102), being in time domain representation into a third signal (104), being in frequency domain representation; and a first frequency domain circuit (105), at least converting said third signal (104) into said first output signal (100). Said apparatus is further being adapted for inputting a first input signal (106) and comprises of a second frequency domain circuit (13) converting said first input signal into a fourth signal (107). Said transformation circuit (103), further being able to convert said fourth signal, being in a frequency domain representation, into a fifth signal (108), being in a time domain representation.

In said apparatus the frequency domain representations are characterised by a set of carriers. Inverse fast Fourier transform of said set of carriers defines an orthogonal frequency division multiplexing symbol.

In an embodiment of the invention said second frequency domain circuit (13), also denoted mapping circuit, is assigning bits of said first input signal to the carriers of the frequency domain representation of said fourth signal.

In an embodiment of the invention said demapping circuit (19) is extracting bits from the carriers of the frequency domain representation of the equalised third signal.

In an embodiment of the invention the symbol reordering circuit in said signal transmitting and/or receiving apparatus is disclosed. Said circuit comprising of a first and a second memory circuit (25, 26), two address generation circuits (36, 37), a demultiplexer (24) and a multiplexer (27).

Figure 7:
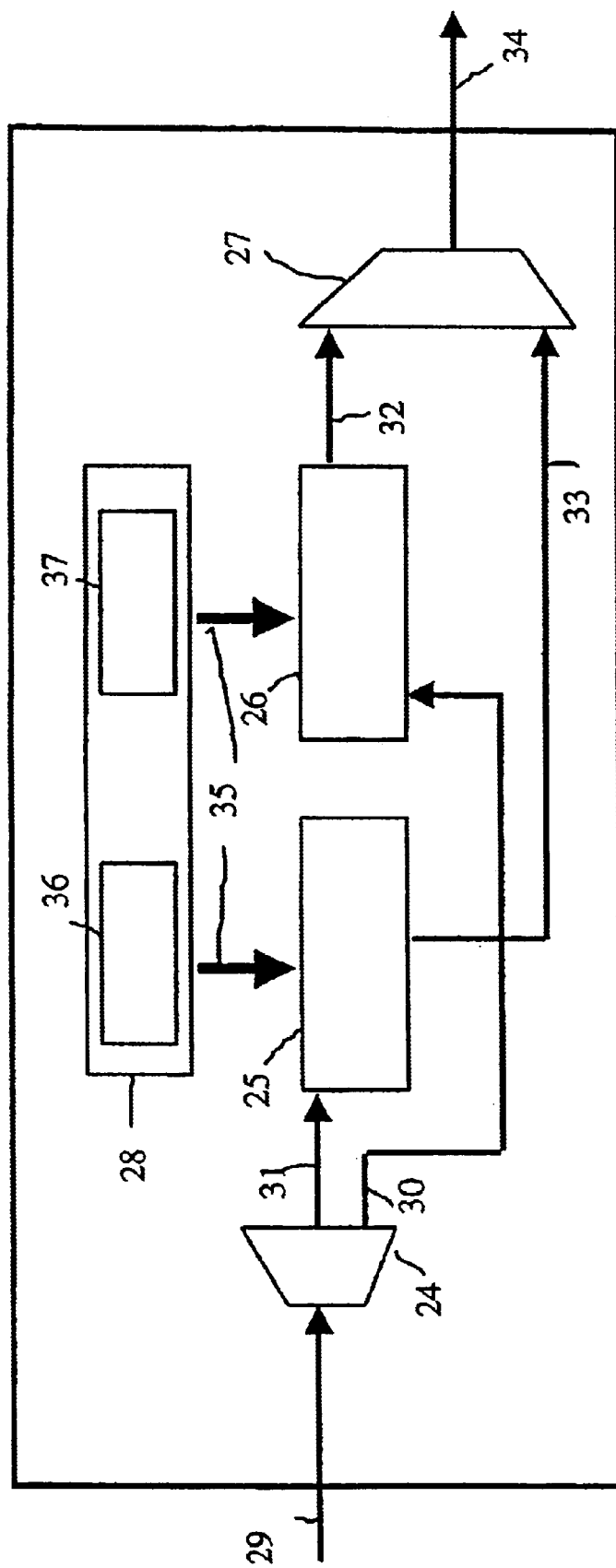
FIG. 7: presents the architecture of a particular embodiment of the symbol reordering circuit. Memory circuits (25, 26), address generators (36, 37), a multiplexer (27) and demultiplexer (24) are recognized.

In an embodiment of the invention said symbol reordering circuit is presented. Said circuit performs guard interval introduction and symbol reordering for the modulating dataflow and symbol reordering, a first step for despreading and zero carrier grouping for the demodulating dataflow. The invented symbol reordering circuit (FIG. 7) comprises of two essentially equal size memory circuits (25, 26), two address generation circuits (36, 37) and two multiplexers (24, 27). The input multiplexer (24) has one input (29). Each of said outputs of said input multiplexer (30, 31) are connected to one of said memory circuits. The output multiplexer (27) has two inputs (32, 33), each connected to one of said memory circuits. The output of said output multiplexer (34) is the output of said symbol reordering circuit.

In an embodiment of the invention said time synchronisation circuit comprises of a timing synchronisation block, a gain or signal level control circuit, a carrier offset estimation circuit and a carrier offset compensation circuit.

Figure 8:
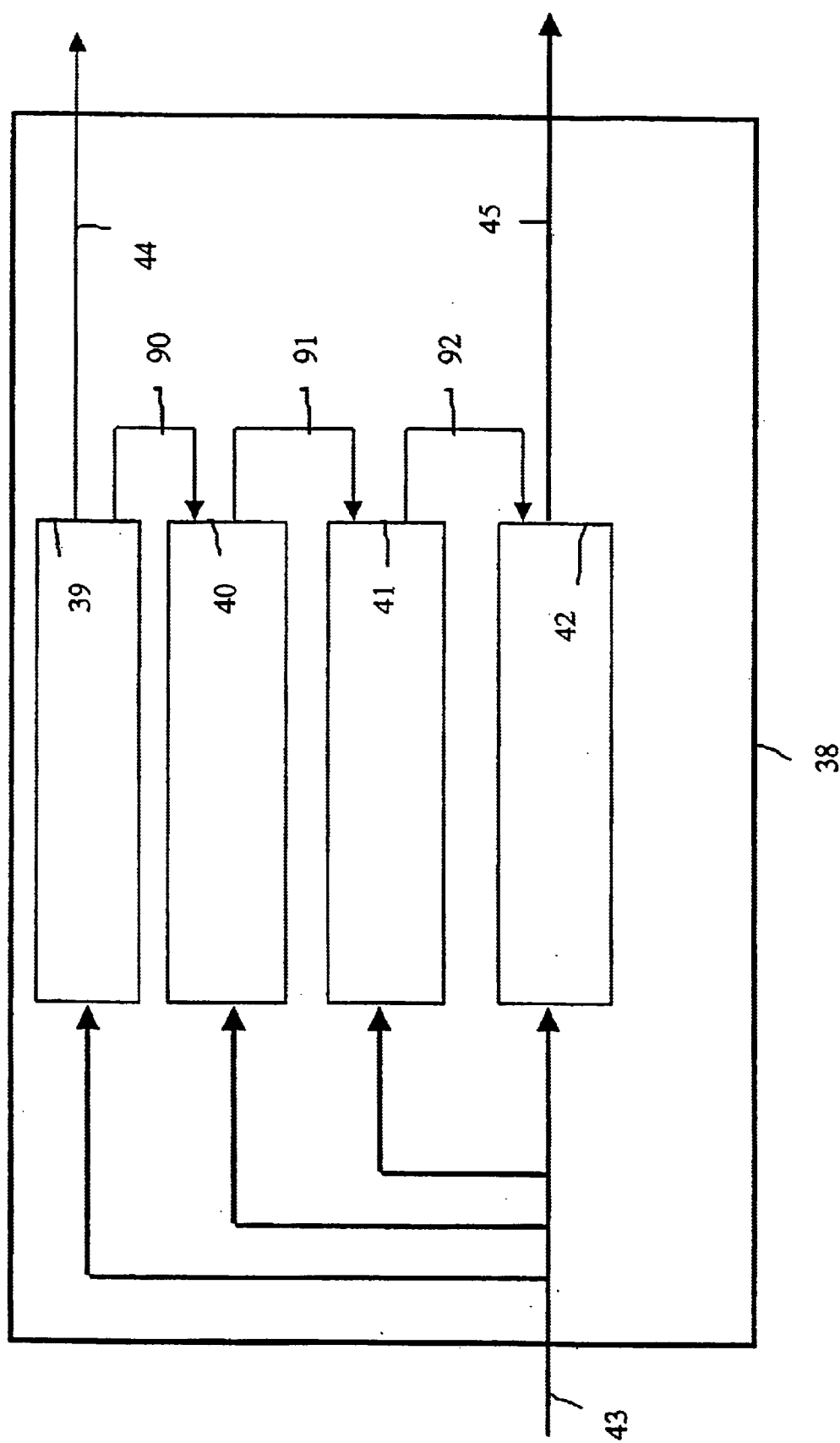
FIG. 8: shows the architecture of a particular embodiment of the time synchronisation circuit (38), comprising of a timing synchronisation circuit (40), a signal level circuit (39), a carrier offset estimation circuit (41) and a carrier offset compensation circuit (42) are recognized.

In an embodiment of the invention a time synchronisation circuit is presented. Said synchronisation circuit performs the following functions: signal level or gain control, timing synchronisation, carrier offset estimation and carrier offset compensation. Said synchronisation block is also denoted as acquisition block (FIG. 8). As such in said synchronisation circuit several functional circuits can be distinguished: gain or signal level control circuit (39), timing synchronisation circuit (40), carrier offset estimation circuit (41) and carrier offset compensation (42). The input of said synchronisation circuit (43) is connected to each of said circuits. The gain or signal level control circuit has as input the input signal (43) and produces the threshold gain factor (90) for the time synchronisation circuit. The gain or signal level control circuit also triggers the external variable gain amplifier. As such the gain control circuit provides a first output (44) of the synchronisation block. It is assumed that the modem has an external variable gain amplifier, situated before the synchronisation circuit (e.g., in the receiving means) (and thus only involved in the demodulating dataflow). The timing synchronisation circuit provides as output a signal (91) for the carrier offset estimation circuit. The carrier offset estimation circuit provides as output a signal (92) for the carrier offset compensation. The carrier offset compensation provides as output the second output (45) signal of said synchronisation circuit. Note that this second output (45) is thus situated in the main data flow of the circuit. Said second output (45) is a data signal while said first output (44) can be considered to be a control signal. It must be emphasised that with carrier offset estimation and compensation the carrier offset between the radiofrequency carrier or main carrier of the transmission and receiving circuit is meant. The carrier offset estimation will be performed on the sequence of reference samples to be found at the beginning of the second sequence of time samples (tracking and data sequence) sent by the transmission circuit. Said reference samples can also be considered in the training signal (FIG. 4). The carrier offset compensation works on the second subsequence of equalisation samples (used for channel estimation) and the data sequence, thus on the modulated digital signal one wants to demodulate. These last sequences form the data signal.

In an aspect of the invention methods of operating said signal transmitting and/or receiving apparatus are disclosed.

In an embodiment of the invention a method of operating a signal transmitting and/or receiving apparatus using orthogonal frequency division multiplexing, wherein said first frequency domain circuit (105) and said transformation circuit (103) define a first data flow, said time synchronisation circuit (17), said transformation circuit (103) and a second frequency domain circuit (13) define a second data flow and either said first or said second data flow is active.

In an embodiment of the invention a method of operating a signal transmitting and/or receiving apparatus, using orthogonal frequency division multiplexing, comprising of a first frequency domain circuit, a fast Fourier transform circuit, a symbol reordering circuit, a time synchronisation circuit and a second frequency domain circuit, said symbol reordering circuit, further comprising of a first and a second memory circuit, two address generation circuits, a demultiplexer and a multiplexer. In said apparatus repetitively switching from writing said first memory circuit and reading said second memory circuit to reading said first memory circuit and writing said second memory circuit and vice versa is performed.

In an embodiment of the invention a method of operating a signal transmitting and/or receiving apparatus, using orthogonal frequency division multiplexing, comprising of a first frequency domain circuit, a fast Fourier transform circuit, a symbol reordering circuit, a time synchronisation circuit, an equalising circuit and a demapping circuit, said time synchronisation circuit, further comprising of a timing synchronisation circuit, a gain control circuit, a carrier offset estimation circuit and a carrier offset compensation circuit, said second frequency domain circuit, said fast Fourier transform circuit, said symbol re-ordering circuit define a first data flow, said time synchronisation circuit, said fast Fourier transform circuit, said symbol reordering circuit, said equalising circuit and said demapping define a second data flow. In said apparatus when said second data flow is active said timing synchronisation circuit determines whether said fast fourier transform circuit, said symbol reordering circuit and said equalising circuit and said demapping circuit must be powered on or off.

Figure 9:
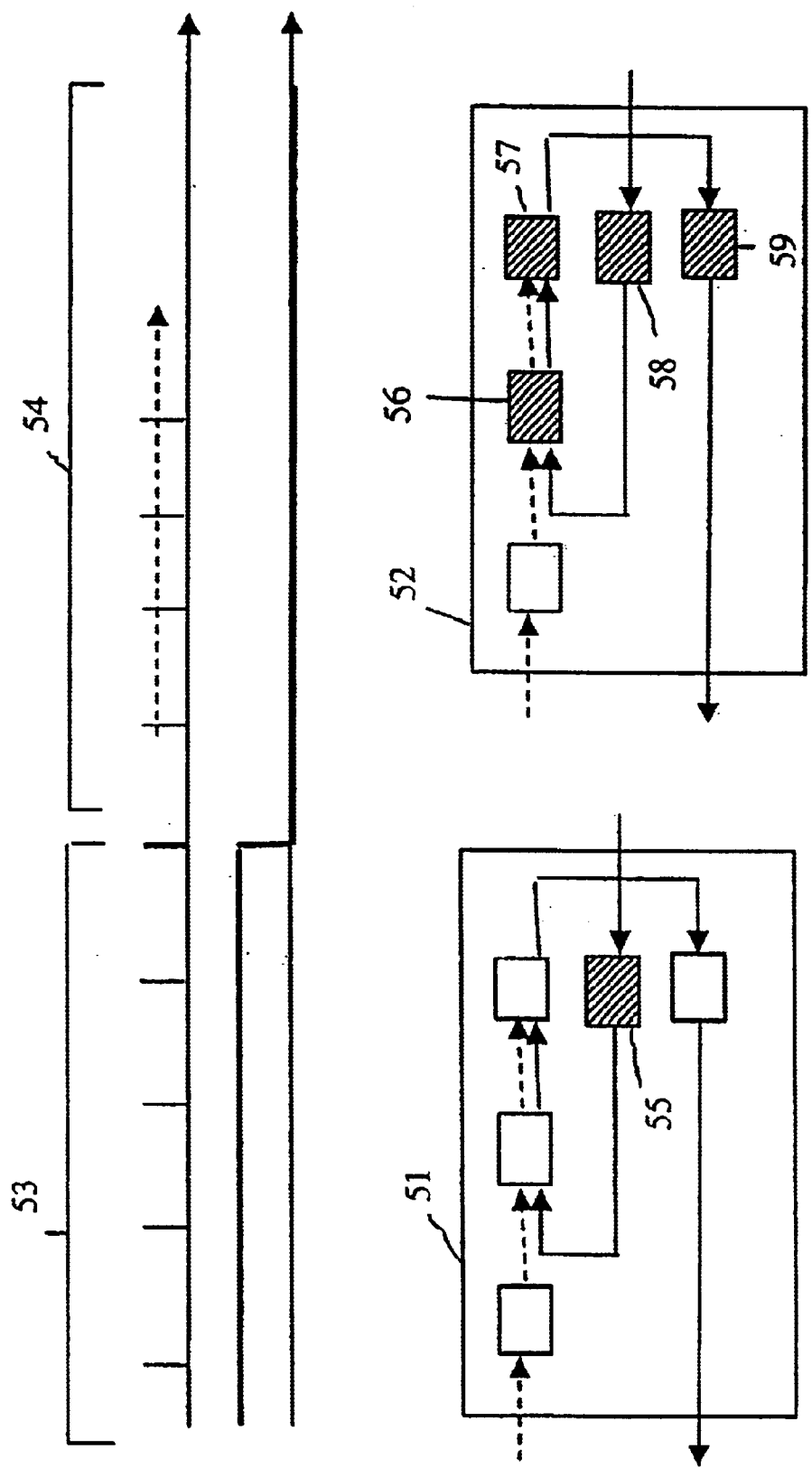
FIG. 9: shows the two phased operation of the disclosed signal transmitting and/or receiving apparatus. This operation results in low power consumption. In a first phase (53) only the time synchronisation circuit (55) is powered on (active). In the second phase (54) all circuits in the receiving data flow (58,56,57,59) are powered on (active). During said first phase the training signal is exploited for determining control information. The training signal is this part of the input signal (101) of the time synchronisation circuit (55), being a non-orthogonal frequency division multiplexing signal.

In an embodiment of the invention during demodulation (time period 54) the synchronisation (or acquisition) circuit (58), the fast fourier transform circuit (56), the symbol reordering circuit (57) and the equalising and demapping circuit (59) of the receiving circuit are powered on while during synchronisation (or acquisition) only the synchronisation circuit (55) of said receiving circuit is powered on while the other circuits are powered off (FIG. 9). The synchronisation step is indicated as the period in time (53) in which said first sequence of samples and said first sequence of reference samples (also denoted carrier-offset preamble) are received. The powering on and off of said circuits is automated based on the successful detection of the timing synchronisation sequence. An important characteristic of the invention is that as such the average power consumption of said modem can be reduced. Note that with said operation during the period in time (53) only a signal must be provided to the time synchronisation circuit. Said signal can be a non-OFDM signal.

In an aspect of the invention a method for communicating data between a transmission circuit and a receiving circuit using orthogonal frequency division multiplexing comprising the steps of sending a training signal by said transmission circuit, sending a data signal by said transmission circuit, said data signal at least comprising said data modulated by said transmission circuit with orthogonal frequency division multiplexing, determining in said receiving circuit control information while receiving said training signal and from said training signal by using first time domain operations and demodulating in said receiving circuit said modulated data while receiving said data signal.

Communication based on OFDM between a transmission circuit and a receiving circuit is assumed in the invention. The communication is meant to be but not limited to be wireless.

In said method essentially two basic phases are recognised (FIG. 9). A synchronisation step, also denoted an acquisition step, needed to obtain control information about the communication channel and the transmission step, wherein the actual transmission of information from the transmitting to the receiving circuit takes place. In the acquisition step also difference between said transmission circuit and the receiving circuit, such as carrier offset, are determined.

Said phases are characterised by the signals sent during said phases. In the acquisition phase a training signal is sent. In the transmission phase the data signal is sent. From said training signal and during reception of said training signal control information is determined by exploiting time domain operations.

Said time domain operations can be but are not limited to correlation, peak detection, integration, complex multiplication and conversion from phase to Cartesian representation with a Cordic.

Said frequency domain operations can be but are not limited to filtering, equalising and demapping.

A particular characteristic of the communication method is that as during the first phase only first time domain operations are performed, the signal on which these time domain operations are performed, can be a non-OFDM signal. As such the signal (101) is characterised to be comprising of a least two parts, a first part being a non-OFDM signal, used for determination of control information and a second part, being a OFDM signal, used for transmission of data. Said first part is denoted the training signal. Said second part is denoted the data signal.

In an embodiment of the invention it is emphasised that a first sequence of samples is sent. It is explicitly mentioned that during receiving of said first sequence synchronisation, meaning determination of relative and absolute timing information and amplification or signal level information, takes place. It is indicated that after receiving said first sequence a second sequence of samples is received. Said second sequence starts with a sequence of reference samples. Said reference samples are used for determining carrier offset information. Said first sequence of samples and said reference samples together form said training signal. After these reference samples a sequence of equalisation samples is sent. It is explicitly mentioned that said equalisation samples are used for channel estimation. Next a sequence of data samples is received. Said data samples comprise of the digital information sent after modulation with orthogonal frequency division multiplexing. Said modulation is performed in said transmission circuit. Demodulation is performed in said receiving circuit. Demodulation means here estimation of channel characteristics from the equalisation samples, carrier offset compensation and filtering and demapping of the data sequence. Said sequence of data can be interrupted by said equalisation sequence, in order to be able to adapt for channel variations. The synchronisation phase (acquisition phase) takes place while receiving said first sequence and the first subsequence of reference samples of said second sequence. The relative and absolute timing information, amplification or signal level information and carrier offset information defines the control information. Said control information is exploited in the demodulation, e.g., for carrier offset compensation.

In an embodiment of the invention in said communication method said demodulation further comprises the steps of: performing second time domain operations on said data signal, converting said data signal from a time domain representation into a frequency domain representation; performing frequency domain operations and exploiting said control information during said second time domain operations. An important characteristic of the invention is the application of time domain operations as a first step in the demodulating data flow on a part of the signal (101), denoted the training signal, not being an OFDM signal.

Figure 10:
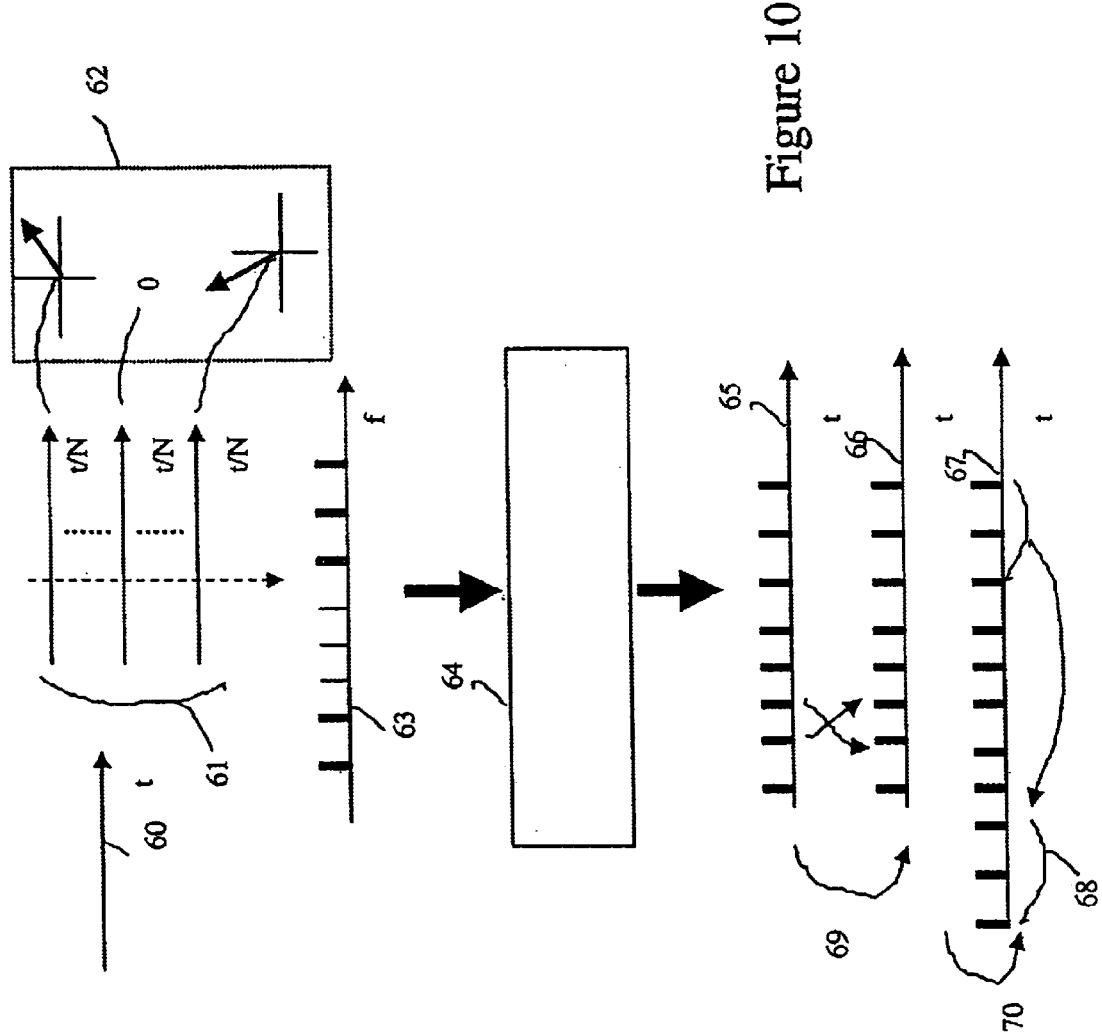
FIG. 10: shows the orthogonal frequency division multiplexing method exploited while transmitting. The bits of the data signal (60) are assigned to a plurality of carriers. A modulation scheme such as QPSK or QAM-16 is used for each of said carriers (62). Other modulation schemes are also possible. Thereafter an inverse N-point fast Fourier transform step (64) is performed, resulting in a OFDM symbol in time domain representation (65). Within said symbol samples can be reordered (69) and a guard interval (68) can be added. The parameter N of the Fourier transform, the length of the guard interval, the modulation scheme can be chosen or is programmable.

In an embodiment of the invention a method for communicating data between a transmission circuit and a receiving circuit using orthogonal frequency division multiplexing is presented (FIG. 10). The digital signal (60) is modulated by setting the amplitude and phase (62) of a set of carriers (61) (signals with a different frequency, said frequencies are selected within a certain interval) following a particular scheme. An adjustable subset of said carriers is left unused and thus not modulated. It is emphasised in the method that as such a new representation of said digital signal is obtained. Said representation is called a frequency domain signal (63). It comprises of frequency samples (containing phase and amplitude information of the related carrier). On said frequency domain symbol an inverse Fourier transform (64) is applied, resulting in a first time domain symbol (65). Said time domain symbol comprises of time samples. The frequency domain signals and time domain symbols have the same amount of samples. Said first time domain symbol is then transformed into a second time domain symbol (67) by reordering (in time) (69) said first time domain symbols samples and then appending the last Ng time samples (68) to the front of said reordered time domain symbol (70). Note that the method of modulating thus introduces the concepts of guard interval introduction and compensates for the reordering introduced in the inverse Fourier transform circuit.

This embodiment can be formulated as a method of communicating, in which modulating said digital signal by said transmission circuit using orthogonal frequency multiplexing, further comprises of:

determining the phases and amplitudes of a set of Nc carriers based on said digital signal, thereby leaving an adjustable subset of said set of carriers unmodulated, applying an inverse fourier transform on said set of carriers such that a first time domain symbol is obtained, said first time domain symbol consists of Nc time samples, transforming said first time domain symbol into a second time domain symbol, thereby reordering the Nc time samples of the first time domain symbol and appending in the front part the last Ng time samples of the reordered first time domain symbol.

Figure 11:
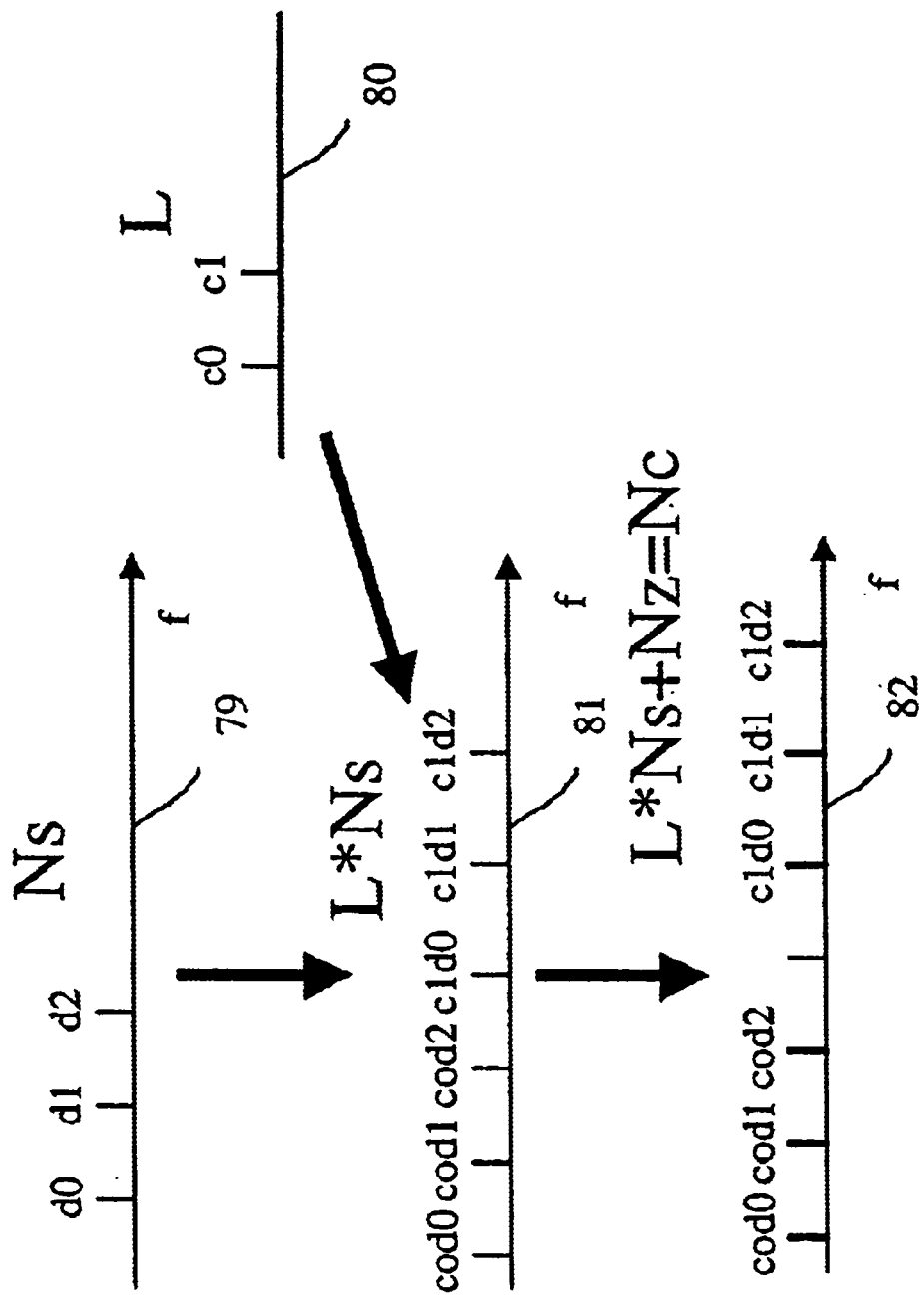
FIG. 11: shows the spreading operation. Based on the amplitudes and phases of a first set of carriers (79) the amplitude and phases of a second set (81) are determined by applying a code with length L. Further some zero carriers can be added as in symbol (82). The length L and the spreading code can be chosen or is programmable.

In an embodiment of the invention the above defined method of communicating is presented, in which determining amplitude and phases of a set of Nc carrier based on the digital signal comprises of two steps (FIG. 11). In a first step the phases and amplitudes of a first set of Ns carriers are determined (frequency domain symbol (79)). Then the phases and amplitudes of L*Ns carriers is determined by multiplying said amplitude and phases with L complex numbers (80) whereby said L*Ns carriers (81) are assigned to Nc carriers (82). Note that Nc is equal to or larger than L*Ns. Indeed from said Nc carriers some carriers (Nz zero carriers) can be left unused or unmodulated. The method implements a spreading operation. Spreading introduces redundancy.

This embodiment can be formulated as a method of communicating, in which determining based on said digital signal the phases and amplitudes of a set of Nc carriers comprises of: determining based on said digital signal the phases and amplitudes of a first set of Ns carriers, determining the phases and amplitudes of a second set of L*Ns carriers by multiplying said phases and amplitudes of said first set of Ns carriers each with L different complex values, defining as such a second set of L*Ns phases and amplitudes, each of said phases and amplitudes relate to one carrier of said first set, and assigning said second set of phases and amplitudes to Nc carriers.

Figure 12:
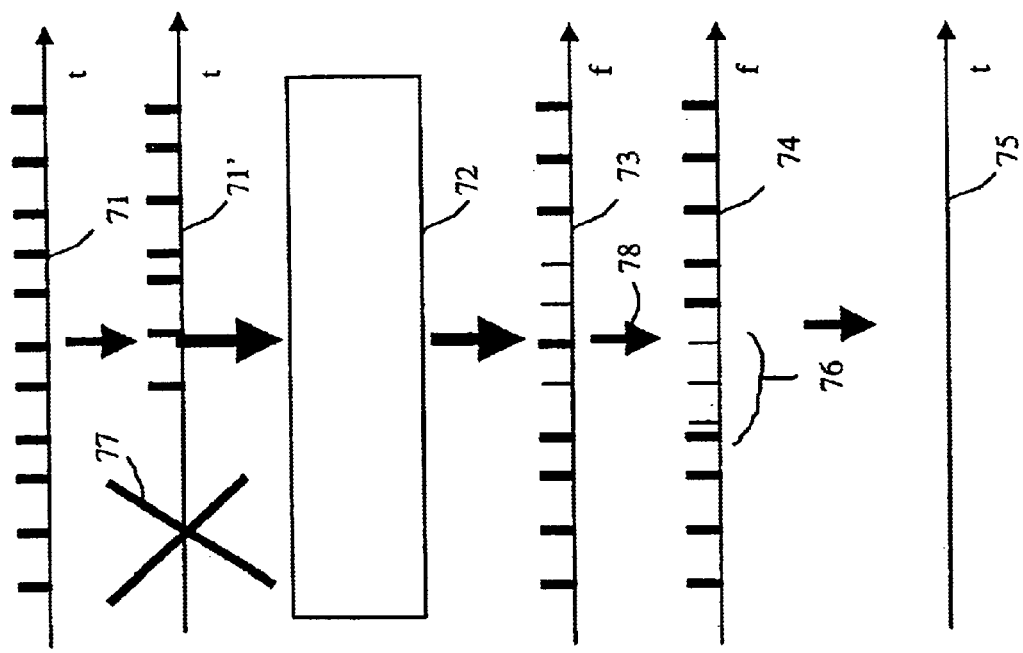
FIG. 12: shows the orthogonal frequency division multiplexing method while receiving. From the received signal (71) in time domain representation the guard interval (77) is omitted. The resulting symbol is then inverse fast Fourier transformed (72), resulting in a signal (73) in frequency domain representation. In said signal (73) reordering (78) of samples is possible, for instance grouping of zero carriers. The resulting signal (76) is then equalised and bits of the different carriers of the symbol are extracted, resulting in a final data signal (75).

In an embodiment of the invention the above defined method of communicating, in which the following method for demodulating a received signal (the modulated digital signal) by a receiving circuit is presented (FIG. 12). First the received signal is amplified, e.g. in the receiving means. Thereby amplification or signal level information from the acquisition phase is used. The amplified modulated digital symbol is a third time domain symbol (71). Then the phase of said time domain symbol is adjusted. This step compensates for carrier frequency mismatch between said receiving and transmitting apparatus. Said compensation step uses information obtained from the acquisition phase. Also the guard interval (77) is removed in this step. After the compensation and guard interval removal step another fourth time domain symbol is obtained (71'). The length of said fourth time domain symbol is L*Ns+Nz. On said symbol a Fourier transform (72) is applied, resulting in a frequency domain signal (73). Said symbol can contain some unused (zero) carriers (not bold). Said second frequency domain signal comprises of L*Ns+Nz frequency domain samples. This symbol is transformed into a third frequency domain signal by reordering (78) the remaining frequency samples at least so that the unused (unmodulated)(zero) carriers (76) are placed at adjacent frequencies. This third frequency signal is then filtered and from the information about the phases and amplitudes of the set of L*Ns carriers the modulated digital signal is reconstructed, thus demodulated (75). An important aspect of the invention is that synchronisation is performed with time domain operations, on part of the signal (101), being a non-OFDM signal.

Another aspect is that the zero carriers are grouped which enables an efficient despreading operation. The guard interval is removed in said synchronisation (or acquisition block) and the reordering of the fast Fourier transform can be done efficiently in said reordering block. Note that instead of grouping zero carriers any other reordering of the zero carriers can be used as well. However, grouping enables easy demapping further on.

This embodiment can be formulated as a method for communicating, in which demodulating said modulated digital signal by said receiving circuit further comprises of: amplifying said modulated digital signal using said amplification or signal level information, said amplified modulated digital signal defines a third time domain symbol; transforming said third time domain into a fourth time domain symbol, thereby adjusting for carrier mismatches between said transmitting and receiving circuit using said carrier offset information and omitting the front part Ng time domain samples, applying a fourier transform to said fourth time domain symbol such that a frequency domain signal is obtained; transforming said frequency domain signal with Nc frequency samples into a frequency domain signal with Nc frequency samples, thereby reordering the frequency samples, and grouping frequency samples related to an unused carrier into adjacent frequency samples; equalising said frequency signal, constructing a digital signal based on the phases and amplitudes of the set of Nc carriers defined by said filtered frequency signal.

In an embodiment of the invention a method for synchronising, to be used in said method for communicating, is presented. Synchronisation takes place while the transmitting circuit sends a first sequence of samples and a subsequence of reference samples to the receiving circuit. Said first sequence of samples consists of two subsequences. Each of said subsequences consists of a limited repetition of a set of samples. The synchronisation proceeds as follows: first the signal level gain or amplification needed is determined from said first subsequence. This results in the amplification or signal level information. Further from said first subsequence relative timing information is determined. It is possible due to the repetitive structure of the subsequence to determine when a new repetition of the set of samples takes place. From the transition from said first subsequence to said second subsequence and the relative timing information absolute timing information is obtained. It is possible to determine an absolute time reference due to the transition. The relative timing information is used to check whether the received transition is legal, meaning occurring at the time where a new repetition of the set of samples is expected to be found. From said absolute timing information the starting time of the carrier offset estimation is determined. The synchronisation must be completed when the receiver sends said second sequence of samples. Said carrier offset estimation uses the sequence of reference samples in the beginning of said second sequence to determine carrier offset information.

This embodiment can be formulated as the communication method in which for synchronisation further said first signal sent by said transmission circuit comprises of a first subsequence of samples and a second subsequence of samples, said first subsequence comprising of a repetition of a first set of samples, said second subsequence comprising of a repetition of a second set of samples. Synchronisation comprises of the following steps: determining from the power of the first subsequence of samples amplification or signal level information, determining from said first subsequence relative timing information, determining from the transition from said first subsequence to said second subsequence and the relative timing information absolute timing information, determining from said absolute timing information the start of the carrier offset estimation, and said carrier offset estimation determines from said reference sequence of reference samples the carrier offset information. The samples of said first set of samples and said second set of samples can for instance be equal up to the sign-bit.

An OFDM technique is used where a guard interval is added to the symbol to be transmitted. The guard interval is a period repetition of the following OFDM symbol. The tail of the symbol is placed in front of the OFDM symbol. This addition is done at the transmitter site. The guard interval is removed at the receiver site. Moreover it is recognised that after the IFFT operation the ordering of the samples of a symbol is changed. Reordering the samples of a symbol is thus necessary. Note that guard interval introduction is exploited to avoid intersymbol interference.

In an embodiment of the invention a particular way of introducing the guard interval and reordering the symbol by a symbol reordering circuit while modulating is presented.

Said symbol is loaded in a memory using a first address generator which produces a first sequence of memory addresses of length Nc. The symbol is then read from said memory using a second address generator which produces a second sequence of memory addresses of length Nc+Ng. Said first and second sequences of memory addresses are essentially different and thus result in a different time ordering of said symbol. Moreover it is indicated that the first part of said second sequence of memory addresses is such that the last Ng time samples of said first time domain symbol are read. As an example with the method described transforming bit-reversed data to linear ordering is possible. The guard interval introduction is done by exploiting a piece-wise linear address generator instead of a linear one as second address generator.

This embodiment can be formulated as a communication method described above in which reordering the Nc time samples of said first time symbol and appending in the front part the last Ng time samples of the reordered first time domain symbol, comprises of: loading said time samples of said first time domain symbol in a memory using a first address generator, said first address generator produces a first sequence of addresses of length Nc, reading said time samples of said first time domain symbol from said memory using a second address generator, thereby defining said fourth time domain symbol, said second address generator produces a second sequence of addresses of length Nc+Ng, said first and second sequence of addresses are essentially different and the first part of the second sequence of addresses is the sequence of addresses needed to read the last Ng time samples of said first time domain symbol.

In an embodiment of the invention a particular way of grouping unused carriers (zero carriers) while demodulating using said symbol reordering block is presented. Note that the guard interval removal is performed in the synchronisation or acquisition block. The received frequency signal is loaded in a memory by using an address generator producing an address sequence of length Nc. The frequency samples of said frequency signal are read from said memory using another address generator producing another address sequence of length Nc. The address sequence of said address generators are essentially different from each other, resulting in a reordering. The address sequence of length Nc is such that the unused frequency samples of said reordered frequency signal are grouped into adjacent frequency samples. Note that with said reordering block any other reordering of the zero carriers can be easily implemented.

This embodiment can be formulated as the communication method described above, in which reordering the Nc frequency samples and grouping frequency samples related to an unused carrier into adjacent frequency samples, comprises of: loading said frequency samples of a frequency domain signal in a memory using a first address generator, said first address generator produces a first sequence of addresses of length Nc, reading said frequency samples of said frequency domain signal from said memory using a second address generator, thereby defining another frequency domain signal, said second address generator produces a second sequence of addresses of length Nc, said first and second sequence of addresses are essentially different and the second sequence of addresses is a sequence of addresses, such that the frequency samples of said original frequency domain signal related to an unused carrier are grouped into adjacent frequency samples of said new frequency domain signal.

In an embodiment of the invention a communication method whereby an additional reordering is performed in said symbol reordering block enabling more (memory) efficient despreading in the demapping circuit. This additional reordering is realised by choosing the address sequence of length Nc such that frequency samples which are related to one carrier of the first set of frequency samples (defined in the modulating step) are grouped into adjacent frequency samples.

This embodiment can be formulated as the communication method described above, whereby said fourth sequence of addresses is such that all frequency samples of a frequency signal related to one of said first set carriers are grouped into adjacent frequency samples.

In an embodiment of the invention a method for constructing a digital signal from Nc carriers is presented whereby first from said Nc carriers the amplitude and phases of Ns carriers are determined is presented. As such despreading (removing of redundancy) is realised.

This embodiment can be formulated as the communication method described above, in which constructing a digital signal based on the phases and amplitudes of the set of Nc carriers defined by a frequency domain signal, whereby each frequency sample relates to one carrier, comprises of: defining the phases and amplitudes of a set of Ns carriers, each of said phases and amplitudes of such a Ns carrier is determined by amplitude and phases of said set of Nc carriers, related to said Ns carrier.

In said apparatus for receiving and/or transmitting signals fast Fourier transform of said orthogonal frequency division multiplexing symbols in time domain representation results in frequency domain signals. With said symbol reordering circuit reordering the orthogonal frequency division multiplexing signals can result in a more efficient despreading.

In an embodiment of the invention a data rate single link up to 98 Mbps is realized. When a number of zero carriers is introduced, an amount sufficient to simplify filters in the transceiver and receiver, and a guard interval, sufficiently long to overcome intersymbol interference, in typical WLAN situations, for instance working in 5.3 GHz band, still a data rate of 75 Mbps is obtained. The apparatus is flexible as various parameters are being programmable. The number of carriers is preferably 256, 128 or 64. The guard length varies preferably between 0 en 28. The spreading factor is preferably 1, 2, 4 and 8. BPSK or QPSK is preferably used as modulation technique on the carriers. The spreading code can also be programmed. The invention is not limited by the above mentioned numbers though. The programmability of the codes and the various parameters results in flexibility.

In an embodiment of the invention, the apparatus and the method can be used for a WLAN wireless LAN application working in the 5.3 GHz band.

In an embodiment of the invention, the apparatus and method can be used for a WLAN wireless LAN application or a home networking application, working in the 2.4 GHz band. Spreading can thereby be introduced as described in said second frequency domain circuit. Spreading can also be introduced by dynamically changing the assignment of the bits to the carriers, thus realizing a hopping operation in the transformation circuit.

What is claimed is:

1. An apparatus for receiving and/or transmitting signals using orthogonal frequency division multiplexing, said apparatus being adapted for outputting a first output signal, comprising:

a time synchronisation circuit, being adapted for determination of control information from a first signal in the time domain representation, said first signal comprising at least of a first part being a non-orthogonal frequency division multiplexing signal and a second part being an orthogonal frequency division multiplexing signal, said determination of control information exploiting said first part of said first signal;

said time synchronisation circuit, further being adapted for converting said second part of said first signal into a second signal, being in time domain representation;

a transformation circuit at least converting said second signal into a third signal, being in frequency domain representation, wherein said frequency domain representations are characterised by a set of carriers, and wherein said transformation circuit comprises a cascade of a fast Fourier transform circuit and a symbol reordering circuit, and said fast Fourier transform circuit performs either a fast Fourier transformation or an inverse fast Fourier transformation;

a first frequency domain circuit, at least converting said third signal into said first output signal; and said second signal and said second part of said first signal being orthogonal frequency division multiplexing signals.

2. The apparatus for receiving and/or transmitting signals as recited in claim 1, wherein said determination of control information comprises of determination of signal level information.

3. The apparatus for receiving and/or transmitting signals as recited in claim 1, wherein said determination of control information comprises of estimation of the carrier offset; and said conversion in said time synchronisation circuit comprises of compensation of said carrier offset.

4. The apparatus for receiving and/or transmitting signals as recited in claim 1, wherein said determination of control information comprises of extraction of timing information.

5. The apparatus for receiving and/or transmitting signals as recited in claim 1, wherein said conversion in said time synchronisation circuit comprises of removal of a guard interval.

6. The apparatus for receiving and/or transmitting signals as recited in claim 1, further being adapted for outputting a second output signal and inputting a second input signal, comprising:

transmission means transmitting said fifth signal as said second output signal;

receiving means receiving said second input signal as said first signal; and said second output signal, being an orthogonal frequency division multiplexing signal.

7. The apparatus for receiving and/or transmitting signals as recited in claim 1, wherein said second frequency domain circuit is assigning bits of said first input signal to the carriers of the frequency domain representation of said fourth signal.

8. The apparatus for receiving and/or transmitting signals as recited in claim 7, wherein said first frequency domain circuit comprising of a cascade of an equalisation circuit and a demapping circuit; and said demapping circuit is extracting bits from the carriers of the frequency domain representation of the equalised third signal.

9. The apparatus for receiving and/or transmitting signals as recited in claim 7, wherein the amount of carriers in said set of carriers being programmable.

10. The apparatus for receiving and/or transmitting signals as recited in claim 1, wherein part of said carriers being zero carriers and the amount of zero carriers being programmable.

11. The apparatus for receiving and/or transmitting signals as recited in claim 7, wherein said second frequency domain circuit performs spreading; and the amount of spreading and the spreading code being programmable.

12. The apparatus for receiving and/or transmitting signals as recited in claim 1, wherein inverse fast Fourier transform of said carriers of said frequency domain representations, results in orthogonal frequency division multiplexing symbols; said symbol reordering circuit, being able to introduce a guard interval in the inverse fast Fourier transformed fourth signal and to reorder the orthogonal frequency division multiplexing symbol in time domain representation of said inverse fast Fourier transformed fourth signal.

13. The apparatus for receiving and/or transmitting as recited in claim 12, wherein said reordering is a first step for despreading.

14. The apparatus for receiving and/or transmitting signals as recited in claim 12, wherein said symbol reordering circuit, with a third input signal and a third output signal, is comprising:

a first and a second memory circuit;

a demultiplexer with as input signal said third input signal and two demultiplexer output signals, each of said demultiplexer output signals being connected to one of said memory circuits; and a multiplexer with two multiplexer input signals and as multiplexer output signal said third output signal, each of said multiplexer input signals being connected to one of said memory circuits.

15. The apparatus for receiving and/or transmitting signals as recited in claim 12, wherein the length of said guard interval being programmable.

16. An apparatus for receiving and/or transmitting signals using orthogonal frequency division multiplexing, said apparatus being adapted for outputting a first output signal and inputting a first input signal, comprising:

a time synchronisation circuit at least converting a first signal into a second signal, being in time domain representation;

a transformation circuit at least converting said second signal into a third signal, being in frequency domain representation;

a first frequency domain circuit, at least converting said third signal into said first output signal;

a second frequency domain circuit converting said first input signal into a fourth signal, being in a frequency domain representation, wherein said frequency domain representations are characterised by a set of carriers, and said second frequency domain circuit is assigning bits of said first input signal to the carriers of the frequency domain representation of said fourth signal, and wherein said transformation circuit comprises a cascade of a fast Fourier transform circuit and a symbol reordering circuit, and said fast Fourier transform circuit performs either a fast Fourier transformation or an inverse fast Fourier transformation;

said transformation circuit, further being adapted for converting said fourth signal into a fifth signal, being in a time domain representation; and said second signal, said fifth signal and part of said first signal, being orthogonal frequency division multiplexing signals.

17. The apparatus for receiving and/or transmitting signals as recited in claim 16, further being adapted for outputting a second output signal and inputting a second input signal, comprising:

transmission means transmitting said fifth signal as said second output signal;

receiving means receiving said second input signal as said first signal; and said second output signal, being an orthogonal frequency division multiplexing signal.

18. The apparatus for receiving and/or transmitting signals as recited in claim 16, wherein said first frequency domain circuit comprising of a cascade of an equalisation circuit and a demapping circuit; and said demapping circuit is extracting bits from the carriers of the frequency domain representation of the equalised third signal.

19. The apparatus for receiving and/or transmitting signals as recited in claim 16, wherein inverse fast Fourier transform of said carriers of said frequency domain representations, results in orthogonal frequency division multiplexing symbols; said symbol reordering circuit, being able to introduce a guard interval in the inverse fast Fourier transformed fourth signal and to reorder the orthogonal frequency division multiplexing symbol in time domain representation of said inverse fast Fourier transformed fourth signal.

20. The apparatus for receiving and/or transmitting as recited in claim 19, wherein said reordering is a first step for despreading.

21. The apparatus for receiving and/or transmitting signals as recited in claim 19, wherein said symbol reordering circuit, with a third input signal and a third output signal, is comprising:
 a first and a second memory circuit;
 a demultiplexer with as input signal said third input signal and two demultiplexer output signals, each of said demultiplexer output signals being connected to one of said memory circuits; and
 a multiplexer with two multiplexer input signals and as multiplexer output signal said third output signal, each of said multiplexer input signals being connected to one of said memory circuits.

22. The apparatus for receiving and/or transmitting signals as recited in claim 19, wherein the length of said guard interval being programmable.

23. The apparatus for receiving and/or transmitting signals as recited in claim 16, wherein the amount of carriers in said set of carriers being programmable.

24. The apparatus for receiving and/or transmitting signals as recited in claim 16, wherein part of said carriers being zero carriers and the amount of zero carriers being programmable.

25. The apparatus for receiving and/or transmitting signals as recited in claim 16, wherein said second frequency domain circuit performs spreading; and the amount of spreading and the spreading code being programmable.

26. An apparatus for receiving and/or transmitting signals using orthogonal frequency division multiplexing, said apparatus being adapted for outputting a first output signal, comprising:
 a time synchronisation circuit, being adapted for determination of control information from a first signal in the time domain representation, said first signal comprising at least of a first part being a non-orthogonal frequency division multiplexing signal and a second part being an orthogonal frequency division multiplexing signal, said determination of control information exploiting said first part of said first signal;
 said time synchronisation circuit, further being adapted for converting said second part of said first signal into a second signal, being in time domain representation;
 a transformation circuit at least converting said second signal into a third signal, being in frequency domain representation;
 a first frequency domain circuit, at least converting said third signal into said first output signal; and
 said second signal and said second part of said first signal being orthogonal frequency division multiplexing signals;
 wherein said time synchronisation circuit, further comprises:
 a timing synchronisation circuit;
 a signal level control circuit;
 a carrier offset estimation circuit;
 a carrier offset compensation circuit;
 a fourth input signal being first input signals of said circuits;
 the output signal of said signal level control circuit being a second input signal of said timing synchronisation circuit;
 the output signal of said timing synchronisation circuit being a second input signal of said carrier offset estimation circuit;
 the output signal of said carrier offset estimation circuit being a second input signal of said carrier offset compensation circuit; and
 the output signal of said carrier offset compensation circuit being a fourth output signal.

27. An apparatus for receiving and/or transmitting signals using orthogonal frequency division multiplexing, said apparatus being adapted for outputting a first output signal and inputting a first input signal, comprising:
 a time synchronisation circuit at least converting a first signal into a second signal, being in time domain representation;
 a transformation circuit at least converting said second signal into a third signal, being in frequency domain representation;
 a first frequency domain circuit, at least converting said third signal into said first output signal;
 a second frequency domain circuit converting said first input signal into a fourth signal, being in a frequency domain representation;
 said transformation circuit, further being adapted for converting said fourth signal into a fifth signal, being in a time domain representation; and
 said second signal, said fifth signal and part of said first signal, being orthogonal frequency division multiplexing signals;
 wherein said time synchronisation circuit has a fourth input signal and a fourth output signal, and further comprises:
 a timing synchronisation circuit;
 a signal level control circuit;
 a carrier offset estimation circuit;
 a carrier offset compensation circuit;
 a fourth input signal being first input signals of said circuits;
 the output signal of said signal level control circuit being a second input signal of said timing synchronisation circuit;
 the output signal of said timing synchronisation circuit being a second input signal of said carrier offset estimation circuit;
 the output signal of said carrier offset estimation circuit being a second input signal of said carrier offset compensation circuit; and
 the output signal of said carrier offset compensation circuit being a fourth output signal.

28. An apparatus for receiving and/or transmitting signals using orthogonal frequency division multiplexing, said apparatus being adapted for outputting a first output signal, comprising:

a time synchronisation circuit, being adapted for determination of control information from a first signal in the time domain representation, said first signal comprising at least of a first part being a non-orthogonal frequency division multiplexing signal and a second part being an orthogonal frequency division multiplexing signal, said determination of control information exploiting said first part of said first signal;

said time synchronisation circuit, further being adapted for converting said second part of said first signal into a second signal, being in time domain representation;

a transformation circuit at least converting said second signal into a third signal, being in frequency domain representation;

a first frequency domain circuit, at least converting said third signal into said first output signal; and said second signal and said second part of said first signal being orthogonal frequency division multiplexing signals;

wherein said transformation circuit comprises a cascade of a N-point fast Fourier transform circuit with N an integer and a symbol reordering circuit; and said N-point fast Fourier transform circuit performs either a fast Fourier transformation or a inverse fast Fourier transformation.

29. The apparatus for receiving and/or transmitting signals as recited in claim 28, wherein said integer N being programmable.

30. An apparatus for receiving and/or transmitting signals using orthogonal frequency division multiplexing, said apparatus being adapted for outputting a first output signal and inputting a first input signal, comprising:

a time synchronisation circuit at least converting a first signal into a second signal, being in time domain representation;

a transformation circuit at least converting said second signal into a third signal, being in frequency domain representation;

a first frequency domain circuit, at least converting said third signal into said first output signal;

a second frequency domain circuit converting said first input signal into a fourth signal, being in a frequency domain representation;

said transformation circuit, further being adapted for converting said fourth signal into a fifth signal, being in a time domain representation; and said second signal, said fifth signal and part of said first signal, being orthogonal frequency division multiplexing signals;

wherein said transformation circuit comprises a cascade of a N-point fast Fourier transform circuit with N an integer and a symbol reordering circuit; and said N-point fast Fourier transform circuit performs either a fast Fourier transformation or a inverse fast Fourier transformation.

31. The apparatus for receiving and/or transmitting signals as recited in claim 30, wherein said integer N being programmable.

32. A method for communicating data between a transmission circuit and a receiving circuit using orthogonal frequency division multiplexing, said method comprising the steps of:

sending a training signal with said transmission circuit;

said training signal being a non-orthogonal frequency division multiplexing signal;

sending a data signal with said transmission circuit, said data signal at least comprising of said data modulated by said transmission circuit with orthogonal frequency division multiplexing;

determining in said receiving circuit control information from said training signal by using first time domain operations;

receiving said modulated data by said transmission circuit; and demodulating in said receiving circuit said received modulated data;

wherein said training signal comprises:
  a first sequence of samples with adjustable length, exploited for determining timing synchronisation information;
  a reference sequence of reference samples with adjustable length, exploited for carrier offset estimation;
  and said data signal comprises of:
    an equalisation sequence of equalisation samples with adjustable length, exploited for channel estimation; said modulated data;
    and wherein said first sequence comprises a plurality of different subsequences;
    the ordering of said subsequences in said first sequence, representing a code;
    said subsequences, being exploited for determining relative timing synchronisation information; and
    said ordering of said subsequences, being exploited for determining absolute timing information.

33. The method as recited in claim 32, wherein said first sequence comprises of:

a first subsequence, exploited for determining relative timing synchronisation information;

a second subsequence; and said method exploiting the transition from the first to the second subsequence for determining absolute timing information.

34. The method as recited in claim 33, wherein said subsequences are Pseudo Noise sequences.

35. The method as recited in claim 33, wherein said first and second subsequence are equal up to the sign-bit.

36. The method as recited in claim 32, wherein said subsequences are Pseudo Noise sequences.

37. A The method as recited in claim 32, wherein said data signal is appended to said training signal.

38. The method as recited in claim 32, further exploiting said control information during demodulation.

39. The method as recited in claim 32, wherein said demodulation further comprises the steps of: performing second time domain operations on said data signal; thereafter converting said data signal from a time domain representation into a frequency domain representation; thereafter performing frequency domain operations on said data signal; and exploiting said control information during said second time domain operations.

40. The method as recited in claim 39, wherein said second time domain operations at least comprise of carrier offset compensation and guard interval removal.

41. The method as recited in claim 39, wherein said frequency domain operations at least comprise of equalising and extracting bits from said data signal in frequency domain representation.

42. The method as recited in claim 39, wherein said conversion of said data signal from time to frequency domain representation is a fast Fourier transformation.

* * * * *